United States Patent
Kudo et al.

(10) Patent No.: US 7,422,243 B2
(45) Date of Patent: Sep. 9, 2008

(54) STRUCTURE OF FUEL PUMP INSTALLATION AREA FOR TWO-WHEELED VEHICLE

(75) Inventors: Takashi Kudo, Saitama (JP); Yoshitaka Yanagibashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 728 days.

(21) Appl. No.: 10/874,382

(22) Filed: Jun. 24, 2004

(65) Prior Publication Data
US 2005/0045399 A1 Mar. 3, 2005

(30) Foreign Application Priority Data
Jul. 29, 2003 (JP) ............................. 2003-282204
Jul. 29, 2003 (JP) ............................. 2003-282206

(51) Int. Cl.
*B62D 61/02* (2006.01)
*B60P 3/22* (2006.01)
*F02M 37/00* (2006.01)

(52) U.S. Cl. ..................... 280/834; 280/833; 280/835; 180/219; 123/509

(58) Field of Classification Search ................. 123/509; 137/565.17; 180/219; 224/413; 280/833, 280/834, 835
See application file for complete search history.

(56) References Cited

U.S. PATENT DOCUMENTS 4,717,163 A * 1/1988 Tsukiji ....................... 280/835
4,871,041 A * 10/1989 Saito et al. .................. 180/219
5,490,573 A * 2/1996 Hagiwara et al. ........... 180/68.1
6,182,640 B1 * 2/2001 Nakashima et al. ......... 123/516
6,253,790 B1 * 7/2001 Hara ...................... 137/565.17
6,401,750 B2 * 6/2002 Tokunaga ............. 137/565.34
6,588,451 B2 * 7/2003 Kuroshita et al. ...... 137/565.17
6,616,187 B2 * 9/2003 Nagasaka ................... 280/835
6,655,363 B2 * 12/2003 Kobayashi et al. ......... 123/509
6,907,865 B1 * 6/2005 Hanby ........................ 123/509
6,913,693 B2 * 7/2005 Unuki ..................... 210/416.4

FOREIGN PATENT DOCUMENTS

JP      2000-72074 A    3/2000
JP      3370888 B2      11/2002

* cited by examiner

*Primary Examiner*—Lesley D. Morris
*Assistant Examiner*—Marc A Scharich
(74) *Attorney, Agent, or Firm*—Birch, Stewart, Kolasch & Birch, LLP

(57) ABSTRACT

A fuel pump installation area for a vehicle for enhancing the stiffness of the fuel pump built in a fuel tank and for enhancing the stiffness of an installation area of a tank installation stay on the fuel tank side. In a motorcycle in which a fuel tank is installed to the body frame and a fuel pump is provided within this fuel tank, the fuel pump is installed to the fuel tank via a pump installation member. To the pump installation member, a tank installation stay for fixing the fuel tank to the body frame is installed. The left and right side walls may be formed by depressing the center of the underside of the fuel tank upwardly over the front and the rear. Concave-shaped engaging members are installed by engaging left and right convex portions provided on the body frame with these engaging members, respectively.

20 Claims, 16 Drawing Sheets

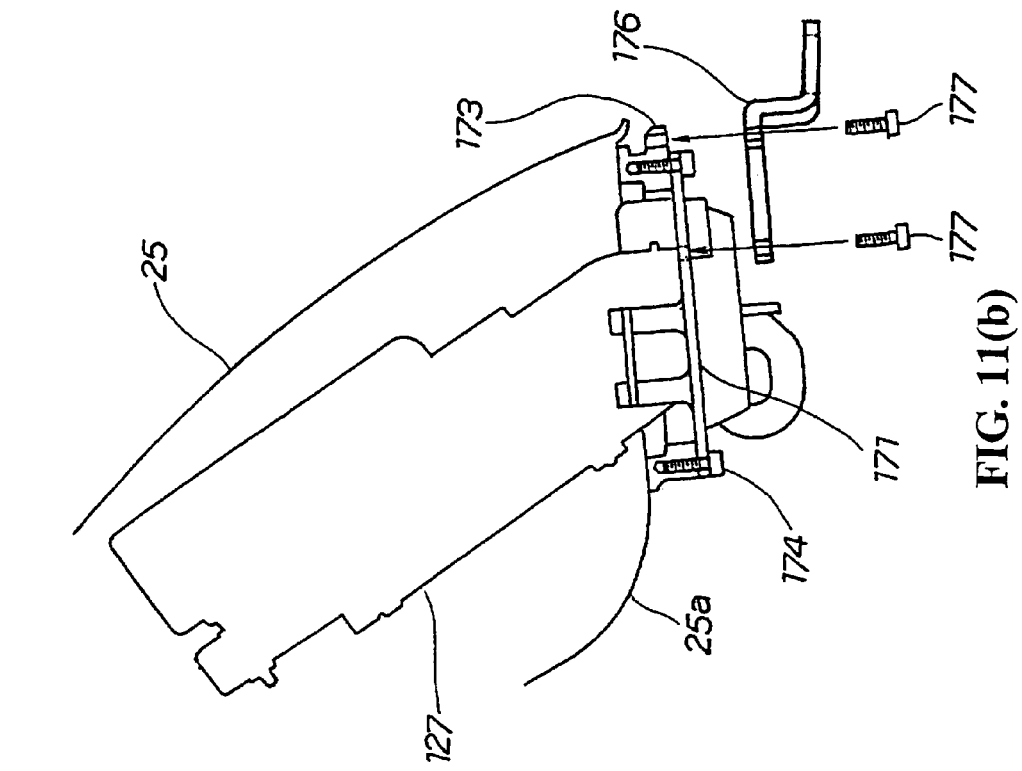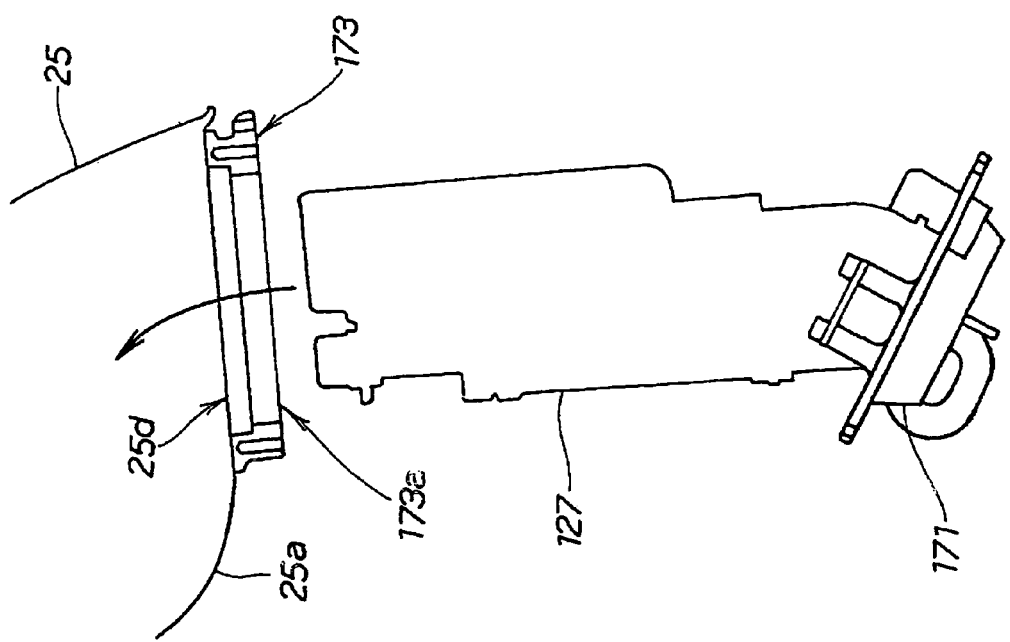
FIG. 11(b)
FIG. 11(a)

STRUCTURE OF FUEL PUMP INSTALLATION AREA FOR TWO-WHEELED VEHICLE

CROSS-REFERENCE TO RELATED APPLICATIONS

The present application claims priority under 35 USC 119 to Japanese Patent Application Nos. 2003-282204 and 2003-282206 both filed on Jul. 29, 2003 the entire contents thereof are hereby incorporated by reference.

BACKGROUND OF THE INVENTION

1. Field of the Invention

The present invention relates to structure of a fuel pump installation area for a two-wheeled vehicle.

2. Description of Background Art

Conventionally, as the structure of a fuel pump installation area for a two-wheeled vehicle, there is known a structure in which a fuel pump is arranged within a fuel tank and installed on a bottom wall of the fuel tank. See, for example, Japanese Patent Laid-Open No. 2000-72074.

FIG. 2 of Japanese Patent Laid-Open No. 2000-72074 will be explained with reference to FIG. 15 of the attached drawings. In this respect, the reference numerals have been re-designated.

FIG. 15 is a cross-sectional view showing conventional structure of a fuel pump installation area for a two-wheeled vehicle wherein a fuel pump unit 303 has been arranged within a fuel tank 300 by installing a cup 302 on a bottom 301, located in the rear of the fuel tank 300, that is curved in a convex shape downwardly and installing the fuel pump unit 303 onto this cup 302.

In FIG. 15, a main frame 305 is provided for constituting a body frame 306; 307, a fuel tank installation stay for installing the rear portion of the fuel tank 300 on the body frame 306 side; 311, an engine; and 312, 313, a throttle body and an air cleaner which are air intake system parts installed to the engine 311, respectively.

The fuel pump unit 303 is long and narrow in shape with one end portion being mounted to the cup 302. However, the fuel pump unit 303 is equipped with articles that have a weight such as a motor. Therefore, a large moment occurs on the fuel pump unit 303 when the vehicle is in operation. Accordingly, in order to support this moment, the cup 302 and the bottom 301 of the fuel tank 300 require a high stiffness.

Also, although the fuel tank installation stay 307 has been directly installed to the bottom 301 of the fuel tank 300, the bottom 301 requires a high stiffness in order to support the fuel tank 300 filled with fuel.

Conventionally, a structure for installing a fuel tank on a two-wheeled vehicle, is known wherein on an inner wall of the front part of the fuel tank there is provided a concave portion with a body frame being provided with a convex portion. The convex portion is caused to engage with the concave portion to thereby install the fuel tank. See, for example, Japanese Patent No. 3370888.

FIG. 7 of Japanese Patent No. 3370888 will be explained with reference to the following FIG. 16. In this respect, in FIG. 16, only the upper half part of FIG. 7 of Japanese Patent No. 3370888 is shown, and reference numerals have been re-designated.

FIG. 16 is a front view partially cross-sectional view) of principal part showing a conventional structure for installing a fuel tank for a two-wheeled vehicle. A left inside plate 1302 of a left tank portion 1301 is provided on the fuel tank 1300 and a right inside plate 1304 of a right tank portion 1303 is provided. An engaging member 1306 is installed, respectively; in the lower part of a main frame 1307. A gusset 1308 is installed and to this gusset 1308, a spindle 1311 for extending from side to side is installed so as to penetrate therethrough. A rubber shock absorbing member 1312 is fitted in both end portions of this spindle 1311, respectively. The rubber shock absorbing members 1312, 1312 are caused to engage with those engaging members 1306, 1306 on the fuel tank 1300 side. In this respect, a concave portion 1313 is formed between the left and right inside plates 1302, 1304 of the fuel tank 1300.

In a case of installing the above-described engaging members 1306 to the left and right inside plates 1302, 1304 of the fuel tank 1300 by welding, if a distance between the left and right inside plates 1302, 1304 is small, it will become difficult to insert, within the concave portion 1313, a welding jig for positioning or fixing the engaging member 1306 in advance on a welder or the fuel tank 1300 during welding. Thus, the workability during welding will be degraded. Further, if the distance between the left and right inside plates 1302, 1304 is made larger, the capacity of the fuel tank 1300 will be reduced. If there is made an attempt to secure the capacity of the fuel tank 1300, the fuel tank 1300 will become large-sized.

Also, in order to reduce the cost, there is a demand for applying the same engaging members 1306 to different types of two-wheeled vehicles. If usable for other vehicle types by a slight change even if not the same engaging members, the cost will be able to be reduced. Further, if setting (for example, size) of the rubber shock absorbing member 1312 could be simply changed by a slight change in the engaging member 1306 depending upon the vehicle type, a condition suitable for the vehicle type will be obtained, which is more preferable.

SUMMARY AND OBJECTS OF THE INVENTION

It is an object of the present invention to enhance the stiffness of an installation area of a fuel pump built in the fuel tank to the fuel tank, and to enhance also the stiffness of an installation area of the tank installation stay on the fuel tank side concerning the structure of a fuel pump installation area for a two-wheeled vehicle.

According to the present invention, there is provided a two-wheeled vehicle in which a fuel tank is installed on a body frame and a fuel pump is provided within this fuel tank. The fuel pump is installed on the fuel tank via a pump installation member and to this pump installation member, a tank installation stay for fixing the fuel tank to the body frame is installed.

The present invention provides an axis of a cylinder of an engine arranged below the fuel tank that is caused to stand up, an air intake system part for extending toward the rear is installed to the rear of the cylinder. The pump installation member and the tank installation stay are arranged substantially above the air intake system part.

In the present invention, since the fuel pump is installed on the fuel tank via the pump installation member and to this pump installation member, the tank installation stay has been installed, as compared with, for example, a case where the fuel pump has been directly installed to the bottom wall of the fuel tank, the stiffness of the fuel pump installation area can be enhanced by the pump installation member. By installing the tank installation stay to such a fuel pump installation area with enhanced stiffness, the stiffness of the fuel pump installation area can be further enhanced, and stiffness of the installation area of the tank installation stay onto the fuel tank side can be also enhanced. Therefore, the fuel pump can be further reliably supported and sound vibration performance of the vehicle can be improved.

According to the present invention, the engine in which the axis of the cylinder has been caused to stand up is shaped such that the front part of the bottom wall of the fuel tank is depressed upwardly and the rear part of the bottom wall of the fuel tank bulges downwardly. In an engine in which the fuel pump has been arranged within the fuel tank, the fuel pump is to be installed in the rear part of the bottom wall at the lowest position of portions of the fuel tank. Further, if the air intake system parts extends toward the rear from the engine, the rear part of the bottom wall of the fuel tank which is located above the air intake system parts will become substantially flat, and the pump installation member will become substantially flush with the tank installation stay so that it becomes possible to combine by making them to come in close proximity to each other. If the pump installation member comes in close proximity to the tank installation stay, it will be possible to shorten the tank installation stay, and to firmly install the fuel tank to the body frame side. Also, the weight of the tank installation stay will be able to be saved.

It is a problem of the present invention to prevent, concerning the structure for installing a fuel tank for a two-wheeled vehicle, the fuel tank from becoming large-sized while securing the capacity thereof, and to enhance general-purpose properties of an installation member for installing the fuel tank to the body frame. Further the present invention makes it possible to perform a slight change in the installation member while restraining the cost from increasing.

According to the present invention, there is provided a structure for installing a body frame for a two-wheeled vehicle in which on left and right inner walls caused by depressing the center of the underside of the fuel tank upwardly over the front and the rear, concave-shaped engaging members are installed, respectively; and the fuel tank is installed to the body frame by engaging left and right convex portions provided on the body frame with these engaging members, respectively. Each engaging member is constructed of two members, a base member welded to the fuel tank and an engaging body and an engaging body for fastening to this base member by means of fastening means.

The present invention includes a concave portion to be provided on the engaging member that is constructed of a first concave portion provided on the base member and a second concave portion provided on the engaging body.

The present invention includes a tank-side rear part installation area provided in the rear of the fuel tank that is constructed such that a tank installation stay for integrally extending from a pump installation member for installing a fuel pump arranged within the fuel tank to the fuel tank is installed to the body frame.

In the present invention aim 1, since the engaging member is constructed of two members, a base member welded to the fuel tank and an engaging body for fastening to this base member by means of fastening means, it is possible to reduce a size of the base member of the present invention to be smaller than the conventional engaging member. In a case of installing the base member to the fuel tank by welding it is easy to insert a welding jig or a welder for positioning or fixing the base member on left and right inner walls inside the fuel tank without interfering with the left and right inner walls.

Accordingly, the workability of the base member during welding can be enhanced, and the capacity of the fuel tank can be secured, or the fuel tank can be prevented from becoming large-sized. Further, since the base member can be made of a small-size, the same engaging member can be installed to fuel tanks for different types of two-wheeled vehicles, and general-purpose properties can be enhanced. When changing a shape of the engaging member depending upon the vehicle type, it is possible to change only one of the base member and the engaging body, to apply the other, and to restrain the cost from increasing.

In the present invention, since the concave portion of the engaging member is constructed of a first concave portion of the base member and a second concave portion of the engaging body, it is possible to prevent the second concave portion from becoming large-sized as compared with, for example, an engaging member, the concave portion of which is constructed of only the second concave portion.

In the present invention, since the tank-side rear part installation area in the rear of the fuel tank has been constructed such that the tank installation stay for integrally extending from the pump installation member is installed to the body frame, the strength/stiffness of the tank-side rear part installation area can be enhanced by the pump installation member and the tank installation stay without increasing a number of parts of the tank-side rear part installation area of the fuel tank as compared with the conventional case even if the engaging member of the fuel tank front part is made into two-parts divided structure. This becomes preferable as the structure for installing the fuel tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11 is a first working view showing an installation procedure for a fuel pump and the fuel tank according to the present invention;

DETAILED DESCRIPTION OF THE PREFERRED EMBODIMENTS

Hereinafter, with reference to the accompanying drawings, the description will be made of the best mode for carrying out the present invention. In this respect, the drawings will be viewed in the direction of the symbol.

Figure 1:
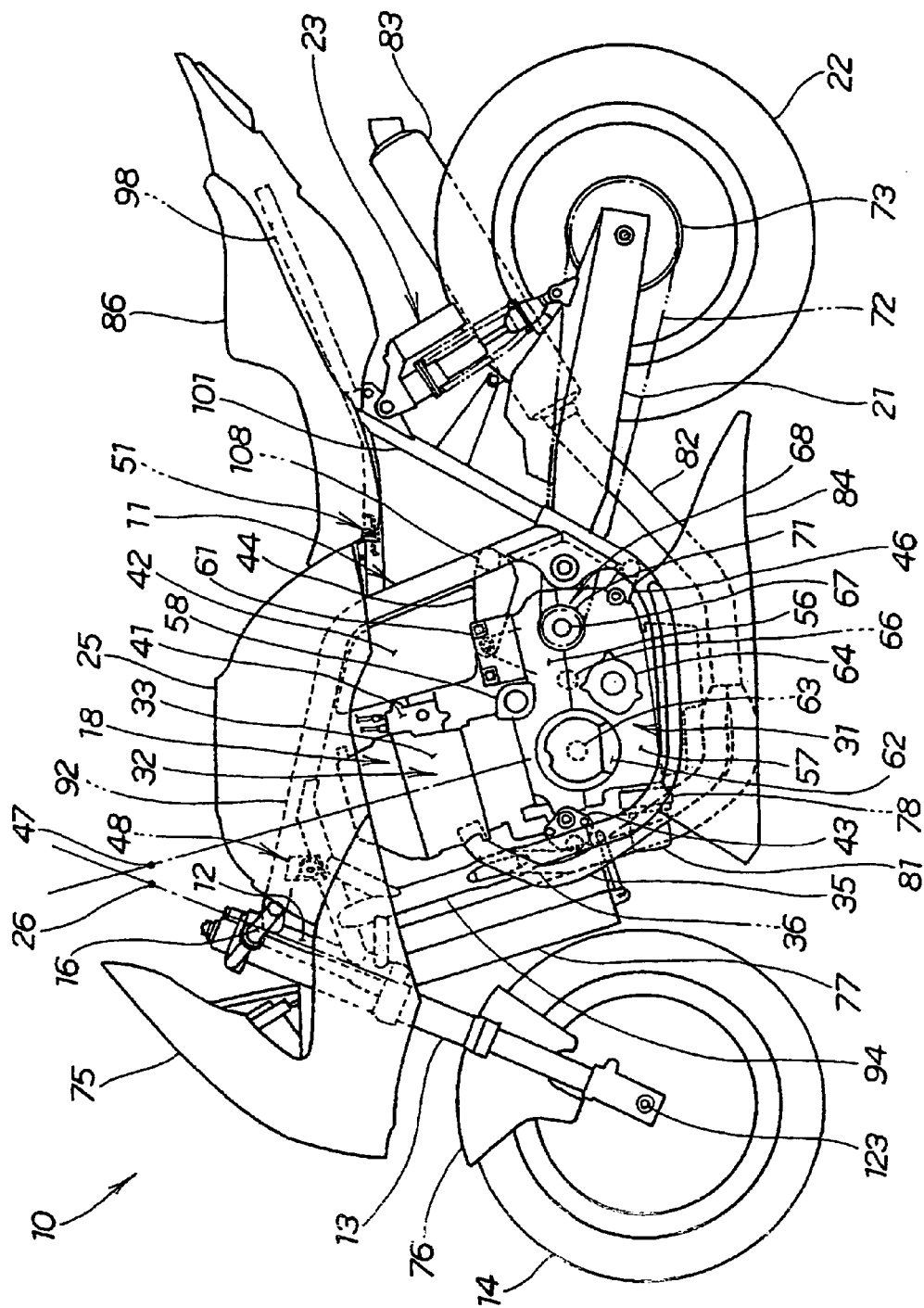
FIG. 1 is a side view showing a two-wheeled vehicle according to the present invention.

FIG. 1 is a side view showing a two-wheeled vehicle according to the present invention. A motorcycle 10 is a vehicle including a head pipe 12 provided in the front part of a cradle type body frame 11 with a front fork 13 installed in such a manner as to be freely steered. At the lower end of this front fork 13, a front wheel 14 is installed. On the upper part of the front fork 13, handlebars 16 are installed. On the inside of the body frame 11, an engine 18 is installed. In the lower part of the rear part of the body frame 11, a swing arm 21 is installed in such a manner as to be freely swingable in the up-and-down direction. At the rear end of the swing arm 21, a rear wheel 22 is installed. Between the upper part of the rear part of the body frame 11 and the rear part of the swing arm 21, a pair of left and right rear shock absorber units 23, 24 (only a symbol 23 on this side is shown) are mounted. On the upper part of the body frame 11, a fuel tank 25 made of aluminum alloy is installed. In addition, an axis 26 of the head pipe 12 is provided.

The engine 18 is an engine in which each cylinder has been arranged in a direction of the vehicle width as a series four-cylinder engine, and is composed of a crankcase 31 and a cylinder portion 32 substantially vertically installed to the front part of the crankcase 31. In the engine 18, from the front part of the cylinder head 33 for constituting the cylinder portion 32, exhaust pipes 35, 36, 37, 38 (here, only exhaust pipes 35, 36 are shown) extend downwardly toward the front for each cylinder. In the rear part of the cylinder head 33, a carburetor 41 and an air cleaner 42 are installed in order; and the engine is installed to the body frame 11 by means of a front engine hanger 43, a rear upper engine hanger 44 and a rear engine hanger 46.

An axis 47 is illustrated for each cylinder of the engine 18. The axis 47 is caused to intersect an axis 26 of the head pipe 12, in other words, the axis 47 is caused to point upwardly of the head pipe 12, whereby the cylinder portion 32 has been set to a substantially upright standing state.

The fuel tank 25 is a part installed to a front part installation area 48 and a rear part installation area 51 provided on the body frame 11.

An upper case 56 and a lower case 57 are provided for constituting the crankcase 31 respectively. A self-starter 58 and a battery 61 are installed to the upper part of the rear part of the crankcase 31, respectively. A cover 62 is provided for an AC generator for projecting from the crankcase 31 sideways of the vehicle body. A crankshaft 63 is operatively connected to the engine with a water pump 64 installed on the side surface of the crankcase 31. A counter shaft 66 and an output shaft 67 are provided on a transmission 68 integrally provided in the rear part of the engine 18, respectively. A drive sprocket 71 is installed on the output shaft 67 with a chain 72 operatively positioned between a driven sprocket 73 integrally installed to the rear wheel 22 and a drive sprocket 71.

An upper cowl 75 is provided for covering the front part of the upper part of the motorcycle 10. A front fender 76 is provided for covering the upper part of the front wheel 14. A radiator 77 is provided for cooling the engine 18. An oil cooler 78 is installed on the lower part of the front part of the engine 18. An oil element 81 is installed on an oil cooler 78. A rear exhaust pipe 82 is connected to each exhaust pipe 35 to 38. A muffler 83 is connected to the rear exhaust pipe 82. An under cowl 84 is provided for covering the lower parts of the engine 18, the exhaust pipes 35 to 38 and the rear exhaust pipe 82. A seat 86 is arranged in the rear of the fuel tank 25.

Figure 2:
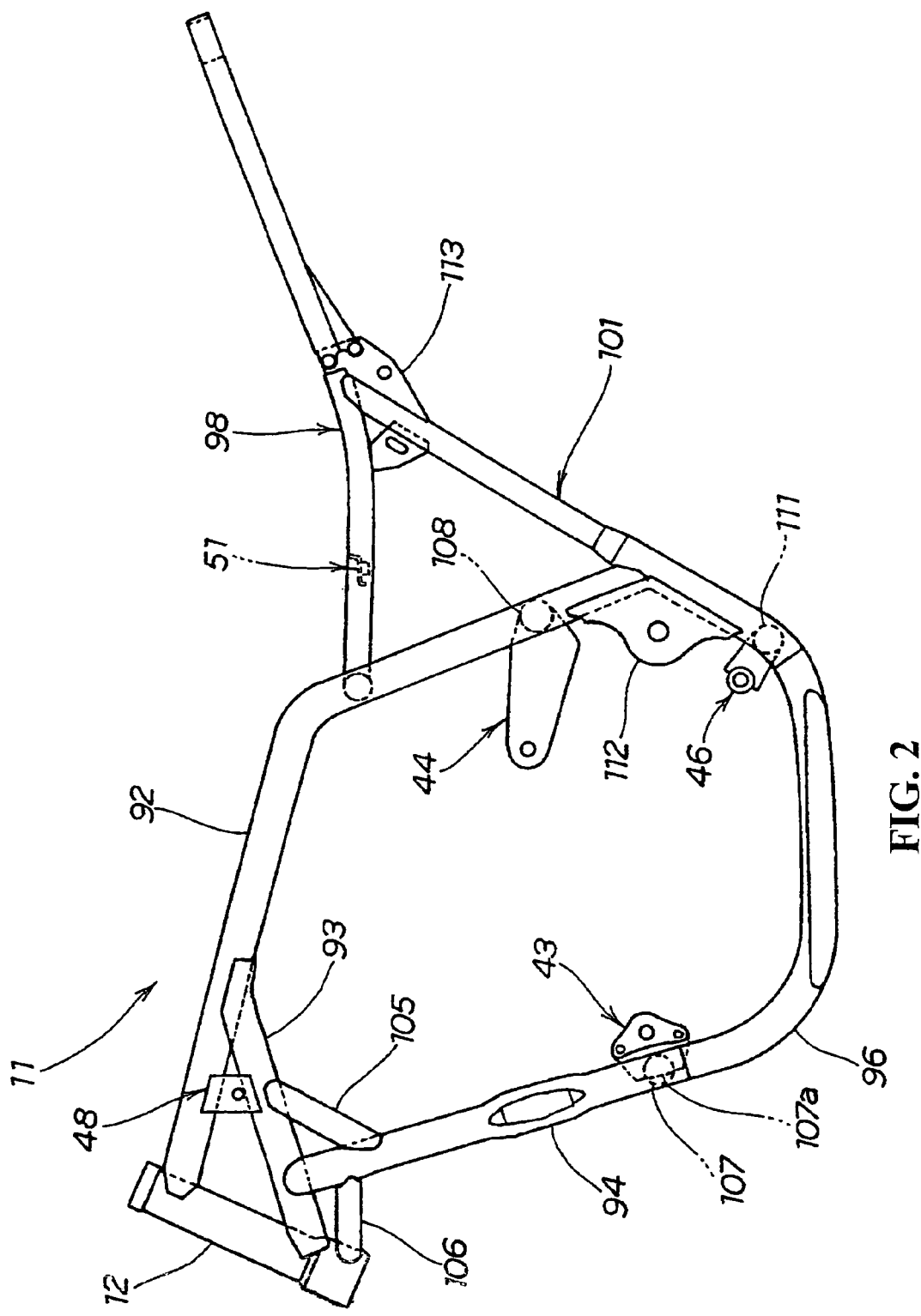
FIG. 2 is a side view showing a body frame for a two-wheeled vehicle according to the present invention.

FIG. 2 is a side view showing a body frame of a two-wheeled vehicle according to the present invention. The body frame 11 is composed of a head pipe 12, a pair of left and right main pipes 92, 92 (only reference numeral 92 on this side is shown) for obliquely extending so as to extend rearwardly and backward from the head pipe 12 and further obliquely extending backward toward the lower part Front pipes 93, 93 (only reference numeral 93 on this side is shown) are laid over to the main pipes 92, 92 from the lower part of the head pipe 12 with a pair of left and right down tubes 94, 94 (only reference numeral 94 on this side is shown) extending substantially toward the lower part from the front pipes 93, 93. Lower pipes 96, 96 (only reference numeral 96 on this side is shown) are provided for extending so as to curve rearwardly from the lower ends of these down tubes 94, 94. Seat rails 98, 98 (only reference numeral 98 on this side is shown) extend rearwardly from the upper part of the rear part of the main pipes 92, 92. Sub-pipes 101, 101 (only reference numeral 101 on this side is shown) are provided for connecting to respective intermediate parts of the seat rails 98, 98 and the rear end portions of the main pipes 92, 92, the lower ends of which are connected to the lower pipes 96, 96.

Reinforcement pipes 105, 105 (only reference numeral 105 on this side is shown), 106, 106 (only reference numeral 106 on this side is shown) are provided between the front pipes 93, 93, the down tubes 94, 94 and the head pipe 12. A first cross pipe 107 is mounted between the down tubes 94, 94 in order to install a front engine hanger 43. A second cross pipe 108 is mounted between the main pipes 92, 92 in order to install a rear upper engine hanger 44. A third cross pipe 111 is mounted between the sub-pipes 101, 101 in order to install a rear lower engine hanger 46. Pivot plates 112, 112 (only reference numeral 112 on this side is shown) are installed to connected portions between the main pipes 92, 92 and the sub-pipes 101, 101 in order to install a swing shaft (that is, a pivot shaft) of a swing arm 21 (See FIG. 1). Shock absorber installation plates 113, 113 (only reference numeral 113 on this side is shown) are installed to connected portions between the seat rails 98, 98 and the sub-pipes 101, 101 in order to install each upper end of the rear shock absorber units 23, 24 (See FIG. 1).

Front installation areas 48 for installing the fuel tank 25 to the body frame 11 are installed to the main pipe 92 and the front pipe 93, and are provided on the left and right of these main pipe 92 and front pipe 93.

Rear installation areas 51 for installing the rear part of the fuel tank 25 to the body frame 11 are installed on the respective insides of the seat rails 98, 98.

Figure 3:
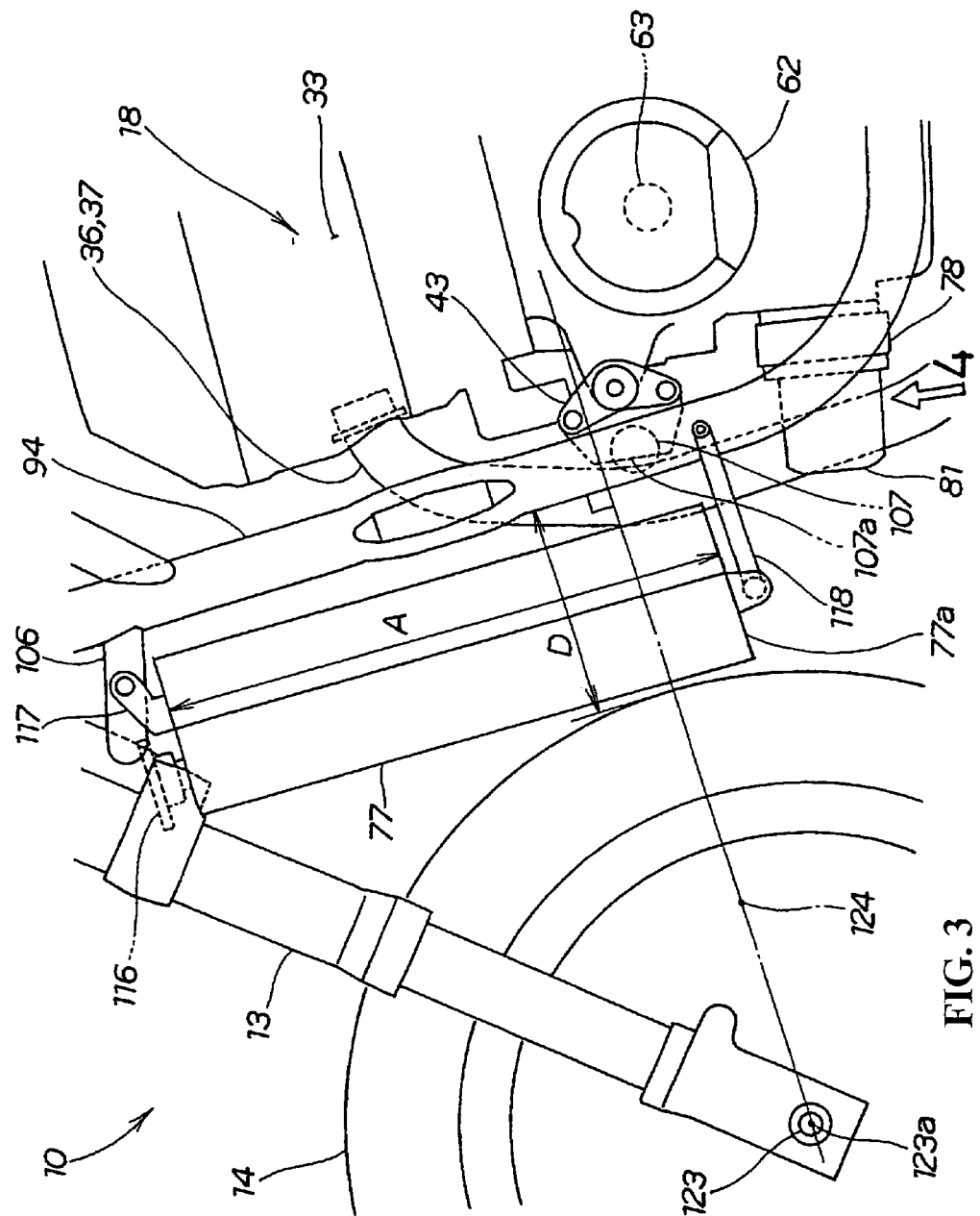
FIG. 3 is a side view showing a principal part of the front part of the two-wheeled vehicle according to the present invention.

FIG. 3 is a side view showing a principal part of the front part of a two-wheeled vehicle according to the present invention wherein in order to support the front engine hanger 43, in the front part of the first cross pipe 107 mounted between the down tubes 94, 94 (only reference numeral 94 on this side is shown), there are provided circular-arc-shaped concave portions 107*a*, 107*a* (only reference numeral 107*a* on this side is shown). Within the circular-arc-shaped concave portions 107*a*, 107*a*, in the front part of the exhaust pipes 35 to 38 (exhaust pipes 35, 38 are not shown), the radiator 77 is arranged through a part of the exhaust pipes 36., 37 (in this case, only the exhaust pipes 36, 37 connected to two cylinders on the inside are shown), of the front cylinders of the engine 18) for extending so as to curve downwardly from the front part of the engine 18. A radiator cap 116 is mounted on the radiator 77. An upper installation stay 117 is provided for installing the upper part of the radiator 77 to the reinforcement pipe 106. A lower installation stay 118 is provided for installing the lower part of the radiator 77 to the down tube 94.

Figure 4:
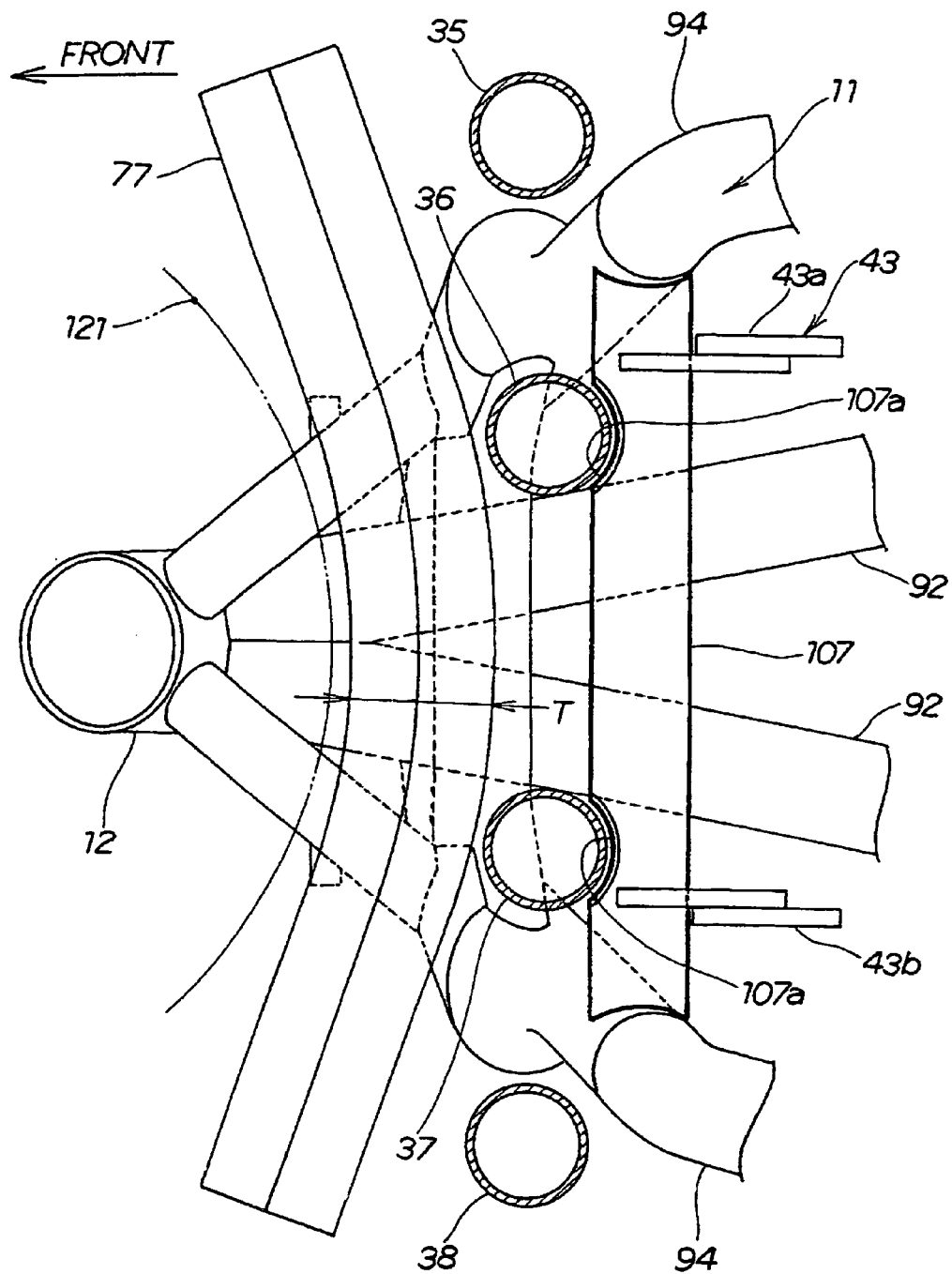
FIG. 4 is a view taken along the arrow 4 of FIG. 3.

FIG. 4 is a view taken along an arrow 4 of FIG. 3 with the exhaust pipes 35 to 38 being illustrated in cross-sectional views. The arrow (FRONT) in the figure indicates the front part of the vehicle (and so forth).

A first cross pipe 107 is provided for constituting the body frame 11 and is a member in which circular-arc-shaped concave portions 107*a*, 107*a* have been formed at the left and right in the front part. Within these circular-arc-shaped concave portions 107*a*, 107*a*, exhaust pipes 36, 37 have been arranged in proximity to each other. Further, a substantially circular-arc shaped radiator 77, the central part of which is convex toward the rear part of the vehicle, has been arranged in proximity to the exhaust pipes 36, 37. A left hanger 43*a* and a right hanger 43*b* are provided which constitute a front engine hanger 43, and are composed of two members, respectively.

As described above, the first cross pipe 107 is provided with circular-arc-shaped concave portions 107*a*, 107*a*. One portion each of the exhaust pipes 36, 37 is arranged within the circular-arc-shaped concave portions 107*a*, 107*a* with the exhaust pipes 36, 37 being arranged further in the rear. The radiator 77 is also arranged in the rear in closer proximity to the exhaust pipes 36, 37. This is because in the space between a locus 121 (locus is the place when the front wheel 14 is moved by the handlebars 16 (See FIG. 1) and a side of the front wheel 14 comes extremely close to the radiator 77) of the outer periphery of the front wheel 14 (See FIG. 3) indicated by an imaginary line in the FIG. 4, and the first cross pipe 107 a thickness T of the radiator 77 is made as large as possible. Thus, the capacity of the radiator 77 is increased to enhance the heat radiation effect. Also, in the present invention, the position of the lower end portion 77*a* of the radiator 77 is arranged at substantially the same position as or lower than the first cross member 107, whereby the height A of the radiator 77 has been made larger to increase the capacity of the radiator 77.

Particularly, in a two-wheeled vehicle of a race specification in which the engine 18 (See FIG. 3) is continuing to be driven at high speed, since the output and durability of the engine 18 are greatly affected by the cooling performance of the radiator 77, it becomes an indispensable condition to have a large-sized radiator 77 having a large capacity.

Reverting to FIG. 3, with respect to an axle 123 of the front wheel 14 and assuming a straight line which passes through a central point 123*a*, which is the center of the axle 123, and intersects a down tube 94 at right angles to be 124, the first cross pipe 107 has been provided below this straight line 124. The positional relationship between the straight line 124 at this time and the first cross pipe 107 is in a so-called "1G state" in which only a driver rides on a motorcycle 10.

A distance D between the front wheel 14 and the down tube 94 becomes extremely small on the straight line 124. The first cross member 107 is provided below the straight line 124 as described above, whereby since the first cross member 107 can be arranged apart from the position whereat the distance D between the front wheel 14 and the down tube 94 becomes extremely small, a distance between the front wheel 14 and the exhaust pipe 36, 37 can be easily secured. For example, in a case where the first cross member 107 is provided above the straight line 124, the distance D becomes small when the front wheel 14 strokes on the handlebars 16 side.

Figure 5:
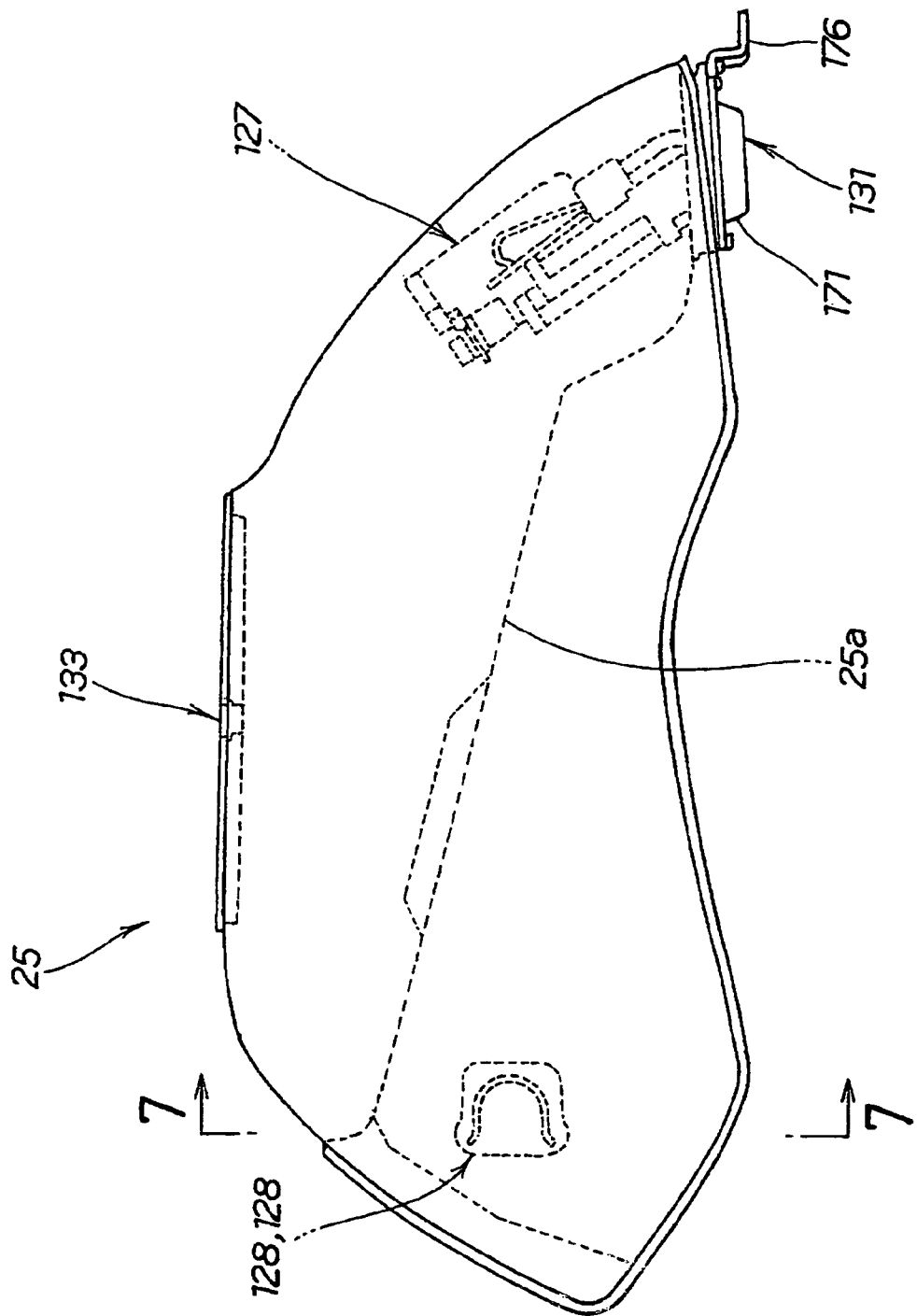
FIG. 5 is a side view showing a fuel tank for the two-wheeled vehicle according to the present invention.

FIG. 5 is a side view showing a fuel tank for a two-wheeled vehicle according to the present invention. The fuel tank 25 includes a rear part of the bottom wall 25*a* wherein a fuel pump 127 is installed and arranged within the fuel tank 25. On the inside of the front part, there are provided a pair of left and right engaging members 128, 128 for engaging with a front part installation area 48 (See FIG. 2) on the body frame 11 (See FIG. 2) side. In the lower part of the rear part, there is provided a tank rear part side installation area 131 to be installed to a rear part installation area 51 (See FIG. 2) on the body frame 11 side. In addition, an oil feeding port 133 is provided.

Figure 6:
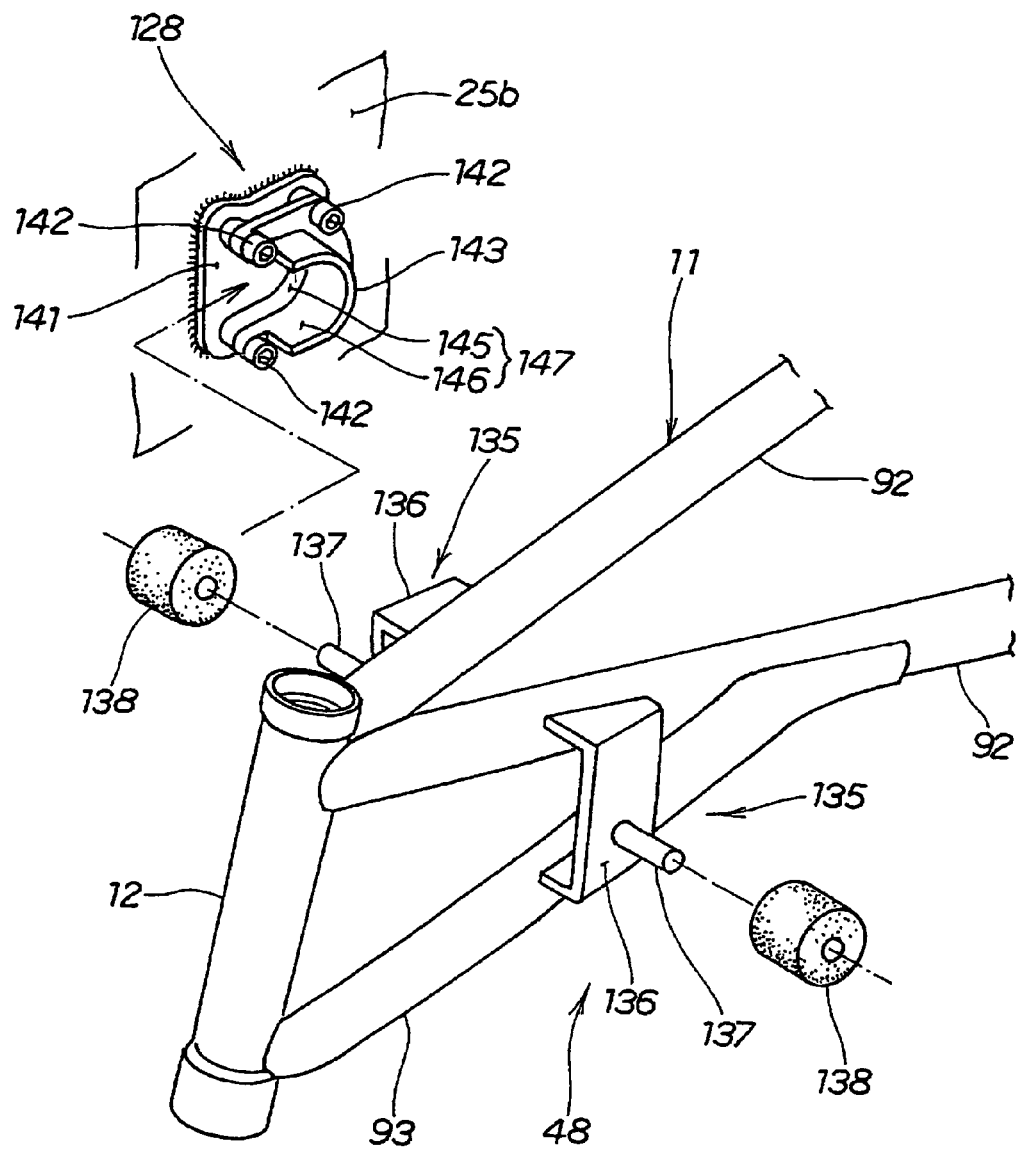
FIG. 6 is a perspective view showing an installation structure for a front part of the fuel tank for the two-wheeled vehicle according to the present invention.

FIG. 6 is a perspective view showing the structure for installing a front part of a fuel tank for a two-wheeled vehicle according to the present invention. The front part installation area 48 on the body frame 11 side is composed of left and right installation areas 135, 135. The installation area 135 is composed of a U-shaped plate 136 installed to the main pipe 92 and the front pipe 93, a supporting pin 137 is provided for extending from the U-shaped plate 136 sideways of the vehicle, and a shock absorbing rubber 138 is provided for being fitted in this supporting pin 137.

The engaging member 128 on the fuel tank 25 (See FIG. 5) side includes two members, a base member 141 made of aluminum alloy welded to a side wall 25*b* of the fuel tank 25, and an engaging body 143 installed to the base member 141 with bolts 142 . . . ( . . . represents a plurality, and so forth). A first concave portion 145 is provided at the base member 141. A second concave portion 146 is provided at the engaging body 143. The first concave portion 145 and second concave portion 146 are portions for constituting an engaging concave portion 147.

Figure 7:
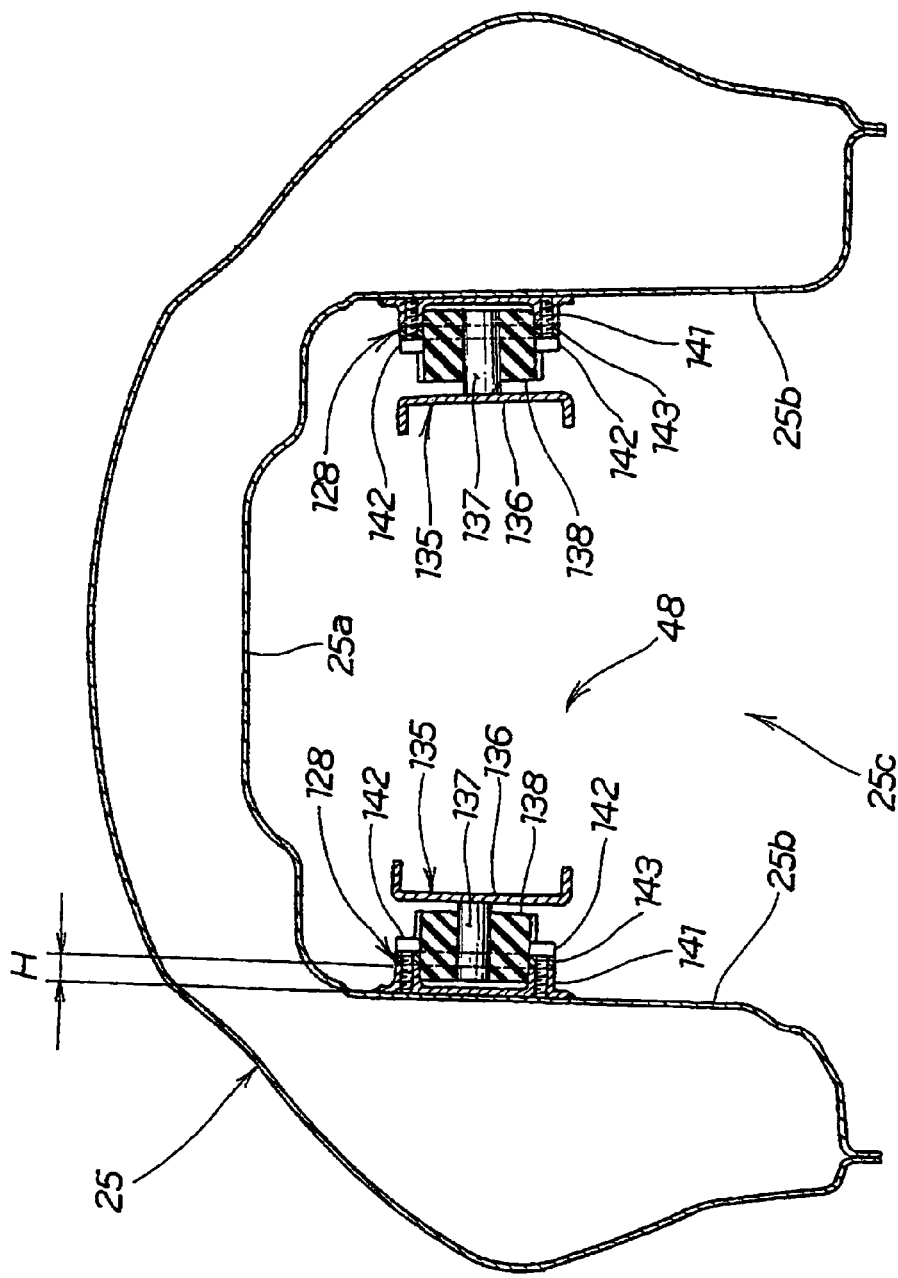
FIG. 7 is a cross-sectional view taken on line 7-7 of FIG. 5.

FIG. 7 is a cross-sectional view taken on line 7-7 of FIG. 5, and illustrating that on the inside of the fuel tank 25, there is formed a concave inner wall 25*c* composed of left and right side walls 25*b*, 25*b* and a bottom wall 25*a* for connecting upper ends of these side walls 25*b*, 25*b*. A base member 141 of the engaging member 128 is welded to the side wall 25*b*. The engaging body 143 is installed to this base member 141 with bolts 142 . . . . The engaging member 128 is caused to engage with an installation area 135 of the front part installation area 48 on the body frame 11 (See FIG. 2) side, that is, the engaging member 128 is supported by the supporting pin 137 and the U-shaped plate 136 via the shock absorbing rubber 138.

Figure 8:
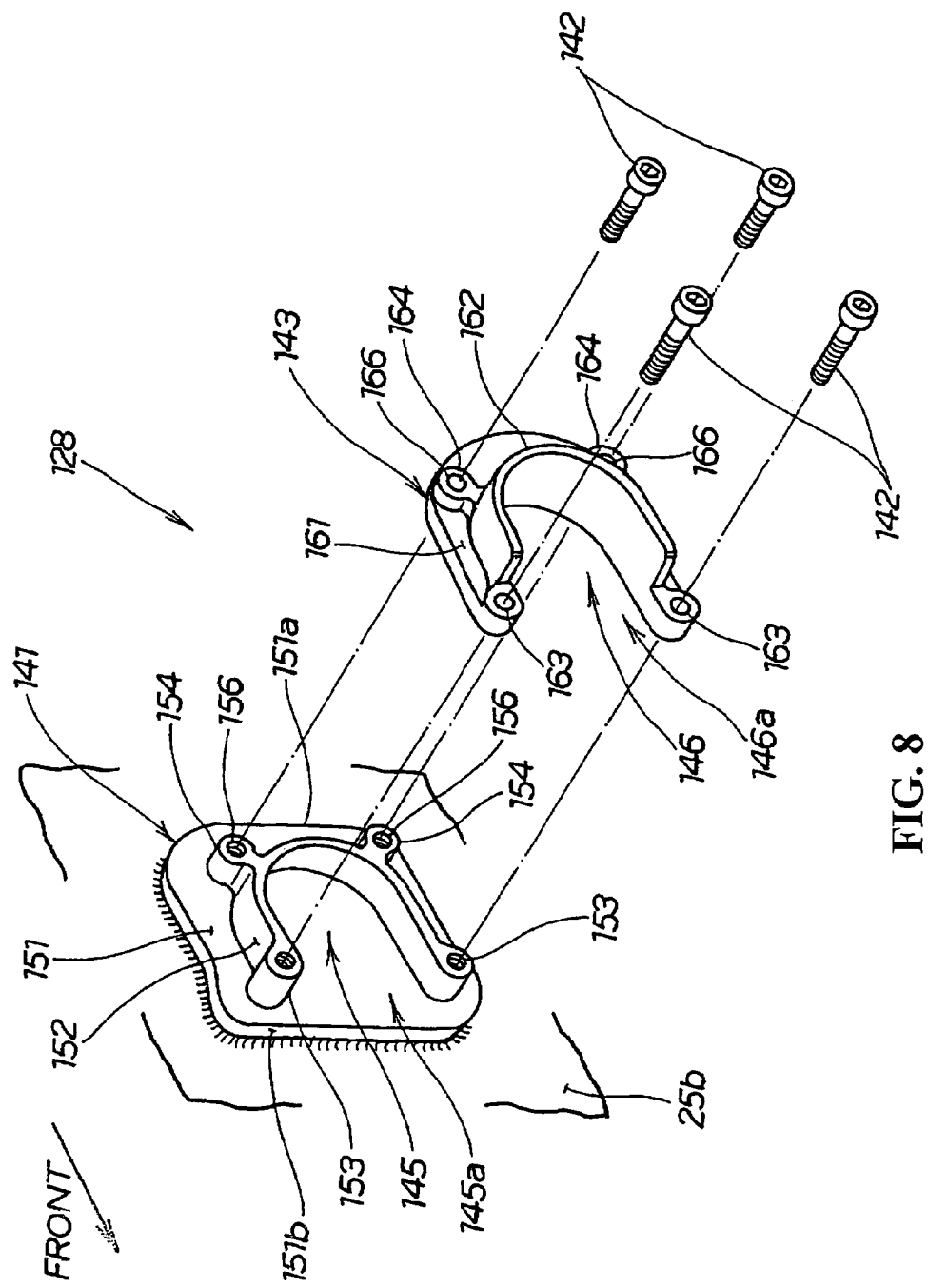
FIG. 8 is an exploded perspective view showing a structure and installation procedure for a fuel tank engaging member for the two-wheeled vehicle according to the present invention.

FIG. 8 is an exploded perspective view showing the structure and assembly procedure of a fuel tank engaging member for a two-wheeled vehicle according to the present invention.

The base member 141 of the engaging member 128 is composed of a flat portion 151, the edge of which is welded to the side wall 25b of the fuel tank 25 (See FIG. 7) and a U-shaped stand-up wall 152 for standing up from the flat portion 151. First female threads 153, 153 are provided on each end portion of the U-shaped stand-up wall 152 with pillar-shaped portions 154, 154 for standing up from the flat portion 151, integrally molded to the U-shaped stand-up wall 152. Second female threads 156, 156 are provided on the pillar-shaped portions 154, 154. The base member 141 is a member wherein on the inside of the U-shaped stand-up wall 152, there has been formed the first concave portion 145.

The engaging body 143 is composed of an U-shaped flat portion 161 with a U-shaped stand-up wall 162 for standing up from this U-shaped flat portion 161. First bolt insertion holes 163, 163 are provided at each end portion of the U-shaped stand-up wall 162 with pillar-shaped portions 164, 164 for standing up from the U-shaped flat portion 161, integrally molded with the U-shaped stand-up wall 162. Second bolt insertion holes 166, 166 are provided on these pillar-shaped portions 164, 164. The engaging body 143 is a member wherein on the inside of the U-shaped stand-up wall 162, there is formed the second concave portion 146.

Hereinafter, the description will be made of the procedure of installing the engaging member 128 to the fuel tank 25 in order.

Positioning and tack fixing are performed on the side wall 25b of the fuel tank 25 through the use of a welding jig in such a manner that an aperture 145a of the first concave portion 145 of the base member 141 faces ahead, and four sides of the flat portion 151 of the base member 141 are continuously welded to the side wall 25b of the fuel tank. A side 151a of the flat portion 151 on the rear side is made shorter than a side 151b on the front side, whereby the welding operation can be further facilitated.

An aperture 146a of the second concave portion 146 of the engaging body 143 is caused to face ahead, and bolts 142 . . . are caused to pass through the first bolt insertion holes 163, 163 and the second bolt insertion holes 166, 166 of the engaging body 143, respectively, to be screwed into the first female threads 153, 153 and the second female threads 156, 156 of the base member 141. Installation of the engaging member 128 to the fuel tank 25 is completed.

Conventionally, the engaging member has been integrally formed, but in the present invention, the engaging member 128 is composed of two members the base member 141 and the engaging body 143. Thus, when the engaging member 128 is welded, since the dimension, particularly the height H (See FIG. 7) of the base member 141 is small, a welding operation of the base member 141 within the concave inner wall 25c can be easily performed, and a welding jig or a welder can be easily inserted into the concave inner wall 25c.

Figure 9:
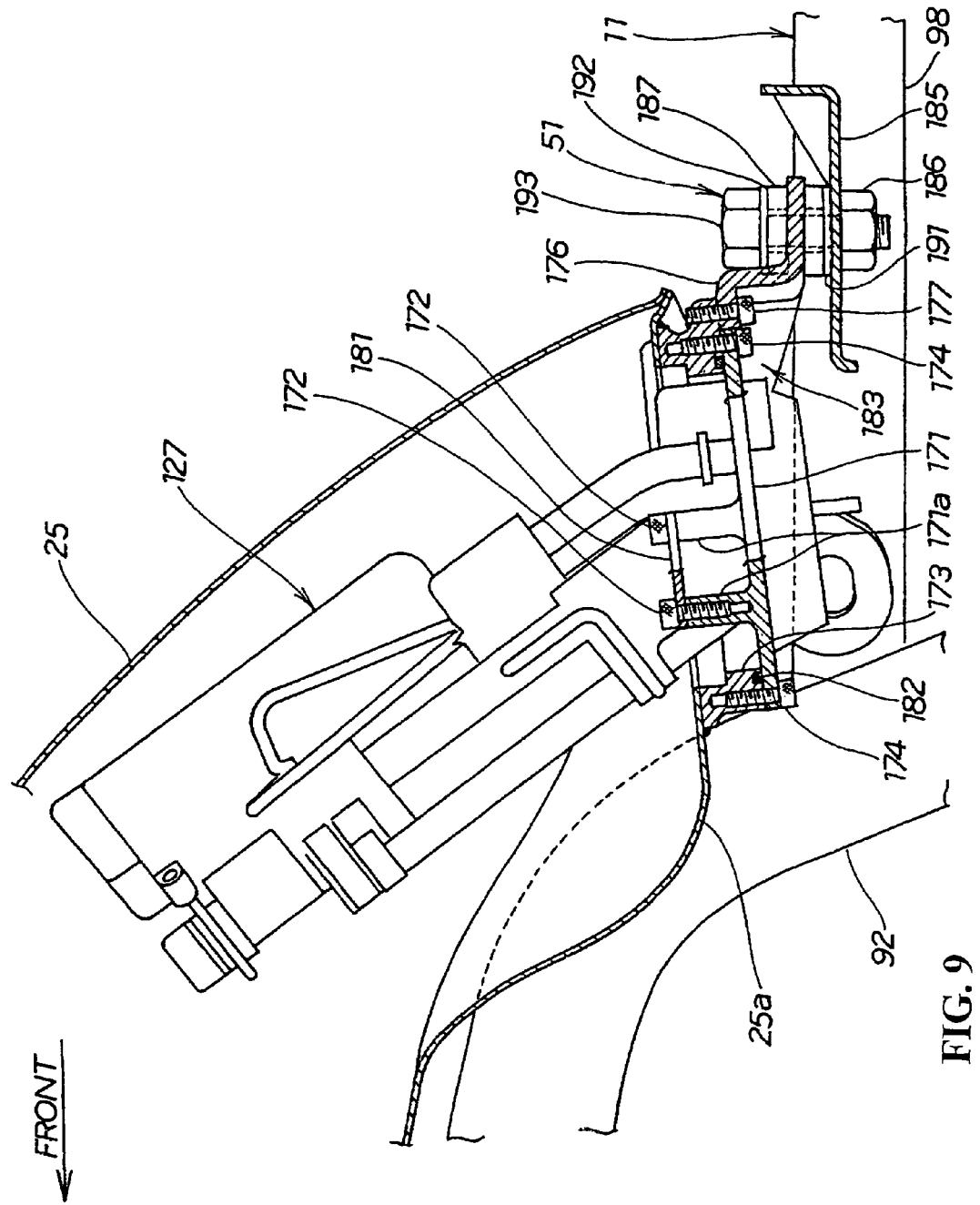
FIG. 9 is a cross-sectional view of a principal part showing an installation structure for a rear part of a fuel tank for the two-wheeled vehicle according to the present invention.

FIG. 9 is a cross-sectional view of principal part showing a structure for installing a rear part of a fuel tank for a two-wheeled vehicle according to the present invention, and illustrating that at the end portion of the fuel pump 127, a supporting plate 171 for supporting the fuel pump 127 is installed with bolts 172 . . . . In the rear part of the bottom wall 25a of the fuel tank 25, a pump installation member 173 is made of an aluminum alloy for installing the fuel pump 127 and is welded thereto. To the pump installation member 173, the supporting plate 171 is installed with bolts 174 . . . . In the rear of the pump installation member 173, the tank installation stay 176 for installing the fuel tank 25 to the body frame 11 (to be precise, a rear part installation portion 51 provided at the seat rails 98, 98 (one seat rail is not shown)) is installed with bolts 177 . . . .

The supporting plate 171 is a part obtained by integrally molding pillar portions 171a . . . to be installed to a pump-side plate 181 provided on the fuel pump 127 side, and is installed to the pump installation member 173 via an O-ring 182.

A tank-side rear part installation area 183 is provided in the rear part of the fuel tank 25 for installation to the body frame 11 and is composed of the above-described tank installation stay 176 and a pump installation member 173 for supporting this tank installation stay 176.

The rear part installation area 51 on the body frame 11 side is composed of a tank rear part supporting plate 185, the cross section of which is substantially a crank-shape, mounted between the left and right seat rails 98, 98. A nut 186 is welded to this tank rear part supporting plate 185 with a cushion rubber 187 fitted in a frame-side installation hole (not shown) provided on the tank installation stay 176. A washer 191 is inserted between this cushion rubber 187 and the tank rear part supporting plate 185, respectively. A flanged collar 192 is provided through which the cushion rubber 187 has been inserted from above the cushion rubber 187. A fitting bolt 193 is provided for penetrating the flanged collar 192 with the washer 191 and the tank rear part supporting plate 185 is screwed into the nut 186. In this respect, for any other parts other than the tank rear part supporting plate 185 of the rear part installation area 51, a pair is provided to the left and right respectively.

Figure 10:
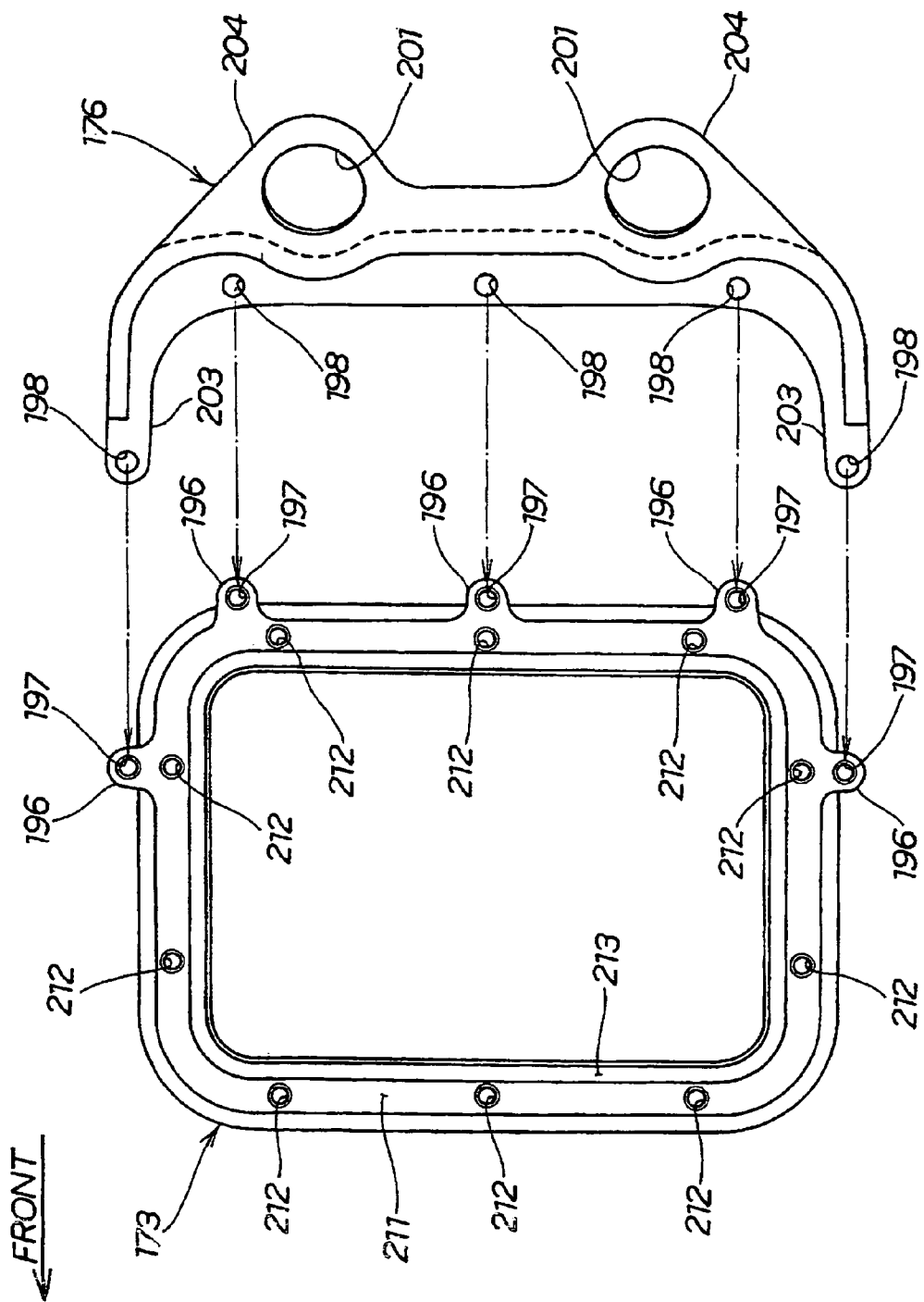
FIG. 10 is a bottom view showing a structure of a fuel tank installation area for the two-wheeled vehicle according to the present invention.

FIG. 10 is a bottom view showing structure of a fuel tank rear part installation area for a two-wheeled vehicle according to the present invention. On a frame-shaped pump installation member 173, there are formed stay installation areas 196 . . . for projecting outward. The stay installation areas 196 . . . are formed with female threads 197, respectively. In a substantially U-shaped tank installation stay 176, bored bolt insertion holes 198 . . . are provided together with frame-side installation holes 201, 201. Each bolt insertion hole 198 of the tank installation stay 176 is matched with each female thread 197 of the pump installation member 173 and the bolts 177 (See FIG. 9) are passed through, respectively, whereby the tank installation stay 176 is installed to the pump installation member 173.

In the tank installation stay 176, forward projecting portions 203, 203 are provided at left and right end portions thereof, and at the tip portions of these forward projecting portions 203, 203, bolt insertion holes 198 are provided, respectively. Thus, the bolt insertion holes 198 are caused not to be in line with bolt insertion holes 198 at three other places, and the tank installation stay 176 is firmly combined with the pump installation member 173 to restrain the tank installation stay 176 from deflecting.

The frame-side installation holes 201, 201 are circular holes bored in rearwardly projecting portions 204, 204 respectively for projecting rearwardly from the tank installation stay 176.

In this case, a plate installation area 211 is provided for installing the supporting plate 171 (See FIG. 9) on the fuel pump 127 (See FIG. 9) side to the pump installation member 173. Female threads 212 . . . are formed on the plate installation area 211. An O-ring groove 213 is provided for mounting the O-ring 182 (See FIG. 9).

Next, an installation procedure for the above-described fuel pump and fuel tank will be explained.

FIGS. 11(a) and 11(b) are first working views showing the installation procedure for the fuel pump and the fuel tank according to the present invention.

In FIG. 11(a), the fuel pump 127 mounted with the supporting plate 171 (portion indicated by a thick line) is inserted into the fuel tank 25 through an aperture 25d provided on the bottom wall 25a of the fuel tank 25 and an aperture 173a of the pump installation member 173 as shown by the arrow. Thus, the supporting plate 171 is installed on the pump installation member 173 with a bolt (not shown).

In FIG. 11(b), the tank installation stay 176 is installed on the pump installation member 173 with bolts 177 . . . .

Figure 12B:
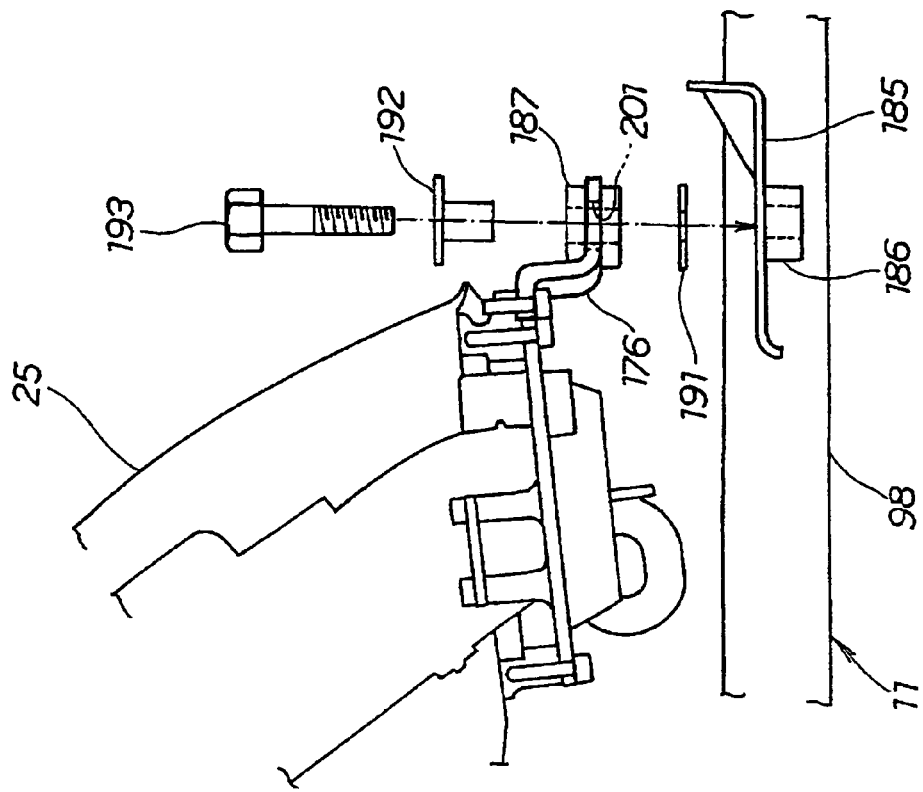
FIG. 12 is a second working view showing an installation procedure for a fuel pump and the fuel tank according to the present invention.
Figure 12A:
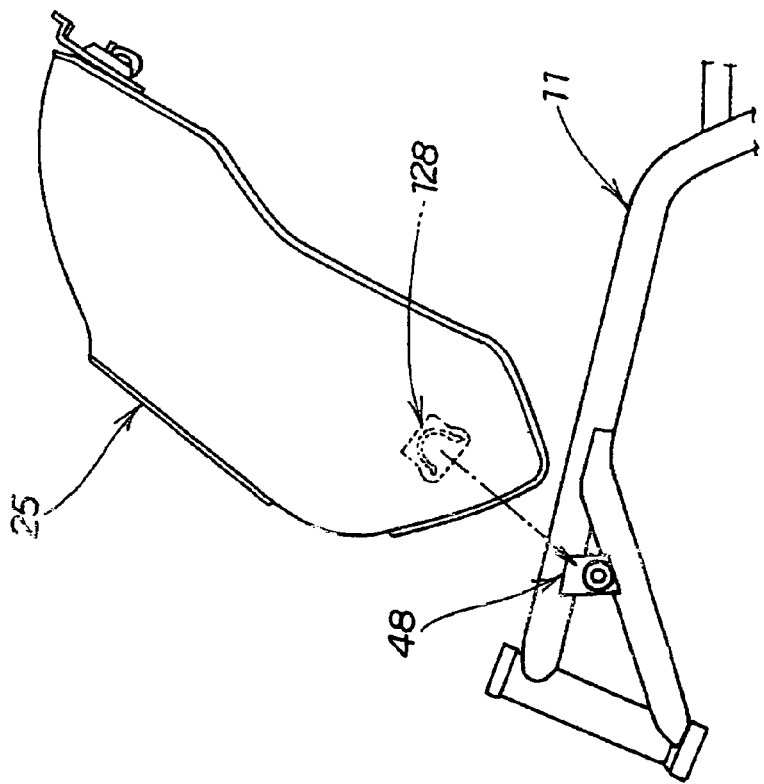

FIGS. 12(a) and 12(b) are second working views showing the installation procedure for the fuel pump and the fuel tank according to the present invention.

In FIG. 12(a), an engaging member 128 of the fuel tank 25 is caused to engage with the front part installation part 48 of the body frame 11.

In FIG. 12(b), the cushion rubber 187 is fitted into the frame-side installation hole 201 of the tank installation stay 176. The washer 191 engages with the underside of the cushion rubber 187 with the flanged collar 192 being inserted into the cushion rubber 187. The fitting bolt 193 is caused to penetrate the flanged collar 192, the washer 191 and the tank rear part supporting plate 185 and is screwed into a nut 186. Thereby, the installation of the fuel tank 25 to the body frame 11 is completed.

As explained in FIGS. 1, 5 and 9, according to the present invention, there is firstly provided a motorcycle 10 as a two-wheeled vehicle in which the fuel tank 25 is installed to the body frame 11. Within this fuel tank 25, there is provided the fuel pump 127, wherein the fuel tank 25 is installed to the body frame 11 via the pump installation member 173. To the pump installation member 173, there is installed the tank installation stay 176 for fixing the fuel tank 25 to the body frame 11.

Since the fuel pump 127 is installed to the fuel tank 25 via the pump installation member 173 and to the pump installation member 173, the tank installation stay 176 has been installed, as compared with, for example, a case where the fuel pump is directly installed to the bottom wall of the fuel tank, the stiffness of the fuel pump installation area can be enhanced by the pump installation member 173, and by installing the tank installation stay 176 to such a fuel pump installation area with enhanced stiffness. Thus, the stiffness of the fuel pump installation area can be further enhanced and the stiffness of the installation area of the tank installation stay 176 to the fuel tank 25 side can be also enhanced as compared with a case where the tank installation stay 176 is directly installed to the bottom wall of the fuel tank. Therefore, the fuel pump 127 can be further reliably supported, the tank installation stay 176 becomes firmer, and sound vibration performance of the vehicle can be improved.

As explained in FIGS. 5 to 9, according to the present invention, there is provided a structure for installing a body frame for a motorcycle 10 in which on the side walls 25b, 25b as left and right inner walls caused by depressing the center of the underside of the fuel tank 25 upwardly over the front and the rear, concave-shaped engaging members 128 are installed, respectively. The fuel tank 25 is installed to the body frame 11 by engaging installation areas 135, 135 as left and right convex portions provided on the body frame 11 with these engaging members 128, respectively. The engaging member 128 is constructed of two members, a base member 141 welded to the fuel tank 25 and an engaging body 143 for fastening to this base member 141 by means of bolts 142 . . . as fastening means.

Since the engaging member 128 is constructed of two members, a base member 141 welded to the fuel tank 25 and an engaging body 143 for fastening to this base member 141 with bolts 142 . . . , it is possible to reduce a size, particularly the height H of the base member 141 of the present invention smaller than the conventional engaging member. In the case of installing the base member 141 to the fuel tank 25 by welding, it is easy to insert a welding jig or a welder for positioning or fixing the base member 141 on side walls 25b, 25b as left and right inner walls inside the fuel tank 25 without interfering with the left and right side walls 25b, 25b.

Accordingly, the workability of the base member 141 during welding can be enhanced, and the capacity of the fuel tank 25 can be secured, or the fuel tank 25 can be prevented from becoming large-sized. Further, since the base member 141 can be made to be small-sized, the same engaging member 128 can be installed to fuel tanks for different types of two-wheeled vehicles, and the general-purpose properties can be enhanced. When changing a shape of the engaging member 128 depending upon the vehicle type, it is possible to change only one of the base member 141 and the engaging body 143, to apply the other, and to restrain the cost from increasing.

The present invention is secondly characterized in that an axis 47 of the cylinder of the engine 18 arranged below the fuel tank 25 is caused to extend upwardly with air intake system parts such as a carburetor 41 and an air cleaner 42 for extending toward the rear being installed in the rear of the cylinder. The pump installation member 173 and the tank installation stay 176 have been arranged substantially above the air intake system parts.

The engine 18 in which the axis 47 of the cylinder has been caused to extend upwardly is shaped such that the front part of the bottom wall 25a of the fuel tank 25 is depressed upwardly and the rear part of the bottom wall 25a of the fuel tank 25 bulges downwardly. In an engine in which the fuel pump 127 has been arranged within the fuel tank 25, the fuel pump 127 is to be installed in the rear part of the bottom wall 25a at the lowest position of portions of the fuel tank 25. Further, if the air intake system parts extend toward the rear from the engine 18, the rear part of the bottom wall 25a of the fuel tank 25 which is located above the air intake system parts will become substantially flat. Thus, the pump installation member 173 will become substantially flush with the tank installation stay 176 so that it becomes possible to be combined by making them to come in close proximity to each other. If the pump installation member 173 comes in close proximity to the tank installation stay 176, it will be possible to shorten the tank installation stay 176 and to firmly install the fuel tank 25 to the body frame 11 side. Also, the weight of the tank installation stay 176 will be able to be saved.

The present invention includes an engaging concave portion 147 that is a concave portion to be provided on the engaging member 128 that is constructed of a first concave portion 145 provided on the base member 141 and a second concave portion 146 provided on the engaging body 143.

Since the engaging concave portion 147 of the engaging member 128 is constructed of a first concave portion 145 of the base member 141 and a second concave portion 146 of the engaging body 143, it is possible to prevent the second concave portion 146 from becoming large-sized, that is, the engaging body 143 from becoming large-sized in the present invention as compared with, for example, an engaging member, the engaging concave portion of which is constructed of only the second concave portion.

In the present invention the tank-side rear part installation area 183 is provided in the rear of the fuel tank 25 that has been constructed such that the tank installation stay 176 for integrally extending from the pump installation member 173 for installing, to the fuel tank 25, the fuel pump 127 arranged within the fuel tank 25 is installed to the body frame 11.

Since the tank-side rear part installation area 183 in the rear of the fuel tank 25 has been constructed such that the tank installation stay 176 for integrally extending from the pump installation member 173 is installed to the body frame 11, the strength/stiffness of the tank-side rear part installation area 183 can be enhanced by the pump installation member 173 and the tank installation stay 176 without increasing a number of parts of the tank-side rear part installation area 183 of the fuel tank 25 as compared with the conventional case even if the engaging member 128 in the front part of the fuel tank 25 is made into a two-part divided structure. This becomes preferable as the structure for installing the fuel tank.

Figure 13:
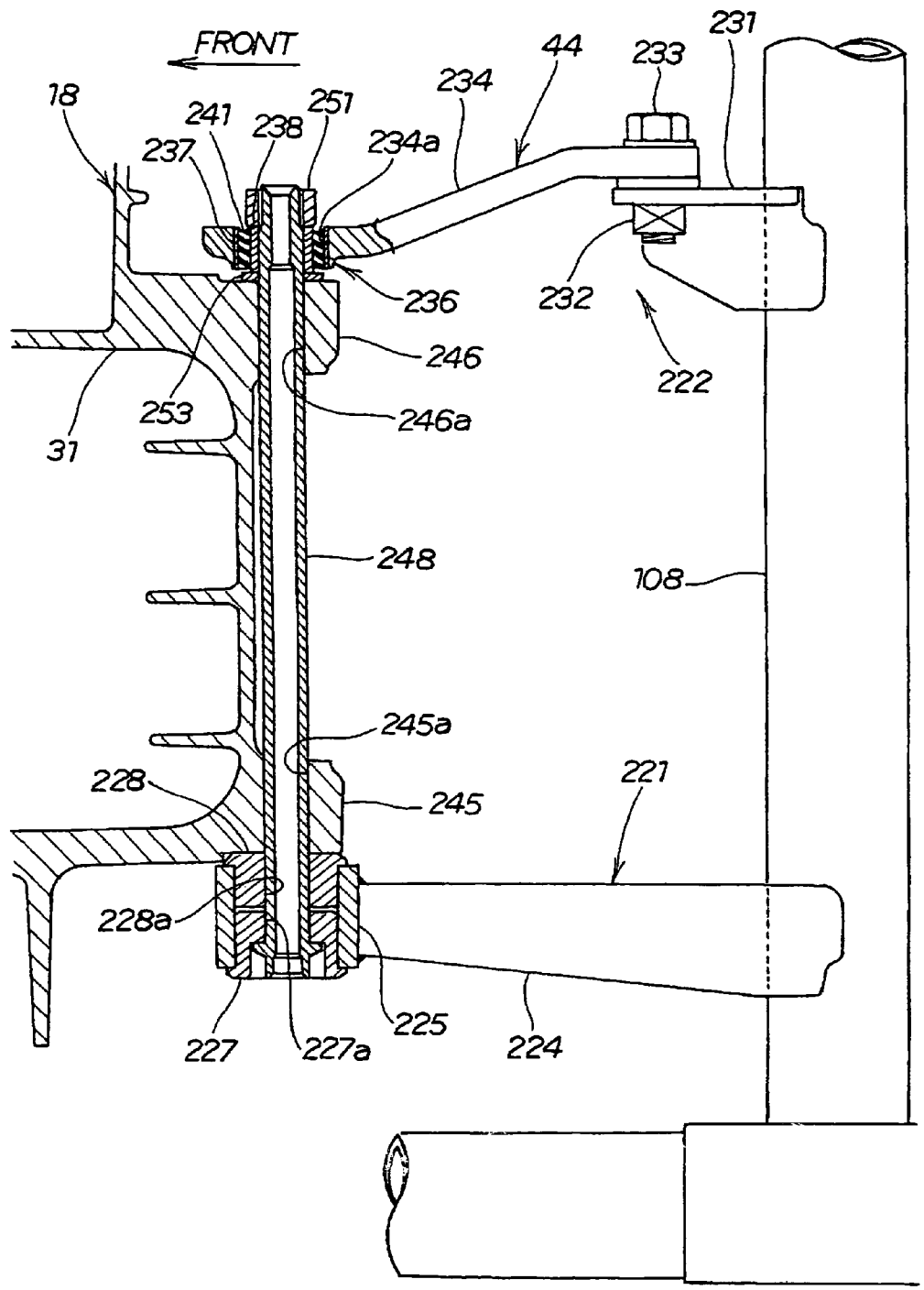
FIG. 13 is a cross-sectional view showing an engine supporting structure for the two-wheeled vehicle according to the present invention.

FIG. 13 is a cross-sectional view showing engine supporting structure for a two-wheeled vehicle according to the present invention illustrating the structure for supporting the engine 18 with a rear upper engine hanger 44.

The rear upper engine hanger 44 is composed of a left hanger 221 and a right hanger 222 which have been caused to project forward from the left and right of the second cross pipe 108, respectively.

The left hanger 221 is composed of a left extending member 224 having a U-shape in cross section obtained by press-forming a plate, and a cylindrical member 225 installed to the tip of this extending member 224.

The cylindrical member 225 is obtained by pressing a first flanged collar 227 made of metal and a second flanged collar 228 made of metal in from the end portion respectively. The first flanged collar 227 and the second flanged collar 228 are members in which a bolt insertion hole 227a, 228a has been bored, respectively.

The right hanger 222 is composed of a base member 231 having a L-shape in cross section obtained by press-forming a plate and a right extending member 234 coupled by a nut 232 and a bolt 233 installed to this base member 231.

The right extending member 234 is a member at the tip portion of which a through-hole 234a has been bored and is obtained by pressing a pipe bushing 236 into this through-hole 234a.

The pipe bushing 236 is composed of an outer cylinder 237, an inner cylinder 238 arranged on the inside of this outer cylinder 237 and shock absorbing rubber 241 adhered by vulcanization between these outer cylinder 237 and inner cylinder 238.

A body-side left installation area 245 and a body-side right installation area 246 are provide and project upwardly toward the rear from the rear part of the crankcase 31 of the engine 18, respectively. The body-side left installation area 245 and body-side right installation area 246 include bored bolt insertion holes 245a, 246a, respectively. Within the bolt insertion hole 227a of the first flanged collar 227, the bolt insertion hole 228a of the second flanged collar 228, the bolt insertion holes 245a, 246a and the inner cylinder 238 of the pipe bushing 236, a hollow supporting bolt 248 is passed through. Into the tip of the supporting bolt 248, a supporting nut 251 is screwed. Thus, the upper part of the rear part of the engine 18 is supported by the rear upper engine hanger 44. In this respect, the washer 253 is interposed between the body-side right installation area 246 and the inner cylinder 238 of the pipe bushing 236.

The engine 18 is, as shown in FIG. 1, supported by the front engine hanger 43, the rear upper engine hanger 44 and the rear lower engine hanger 46.

Since the front engine hanger 43 and the rear lower engine hanger 46 support the engine 18 via the collar made of metal as in the case of the above-described left hanger 221 the combination with the engine 18 becomes firmer. As described above, of the three engine hangers 43, 44, 46, the rear upper engine hanger 44 and particularly the right hanger 222 is elastically supported via the pipe bushing 236. This is because the stiffness of the body frame 11 to which the engine 18 has been added is adjusted by changing the setting of the hardness of rubber. In other words, as compared with a case where all places of the engine hangers are combined in a so-called rigid way via collars made of metal, the body frame 11 has been slightly provided with flexibility in the present invention.

Another reason why the engine 18 has been elastically supported by the right hanger 222 is that it is easier to maintain than other engine hangers 43, 46 and the left hanger 221.

If the supporting nut 251 is loosened to be removed from the supporting bolt 248, and the bolt 233 of the right hanger 222 is loosened to remove the right extending member 234 from the base member 231, the pipe bushing 236 will be able to be easily attached or detached to or from the right extending member 234.

Also, as regards the supporting bolt 248, the weight thereof has been saved by making it hollow.

Next, the description will be made of the procedure for installing the engine 18 to the above-described rear upper engine hanger 44.

FIGS. 14(a) to 14(d) are working views illustrating the procedure for installing the engine to a rear upper engine hanger for a two-wheeled vehicle according to the present invention.

Figures 14A, 14B, 14C, 14D:
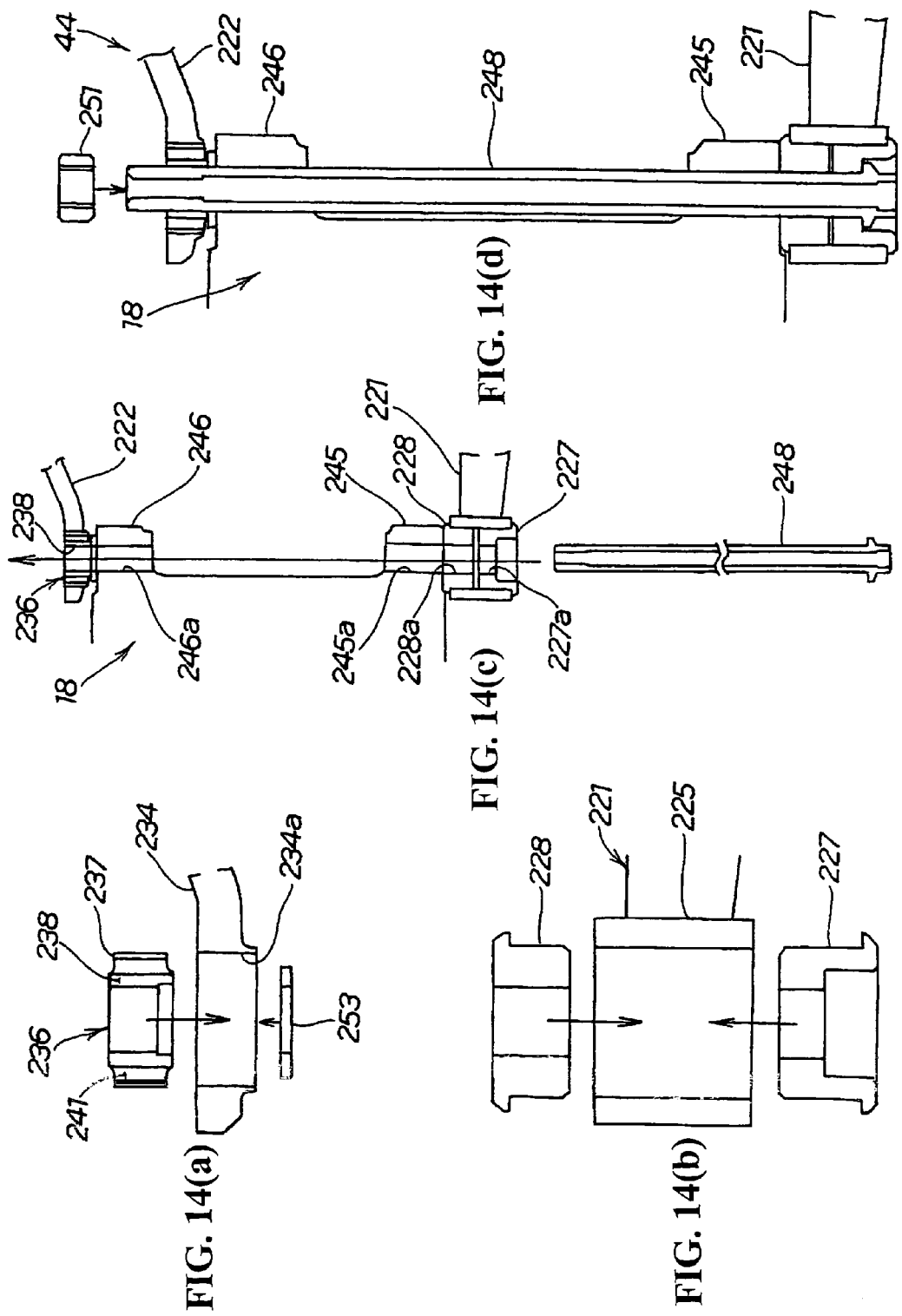
FIG. 14 is a working view showing a procedure for installing the engine to a rear upper engine hanger of the two-wheeled vehicle according to the present invention.
Figure 15:
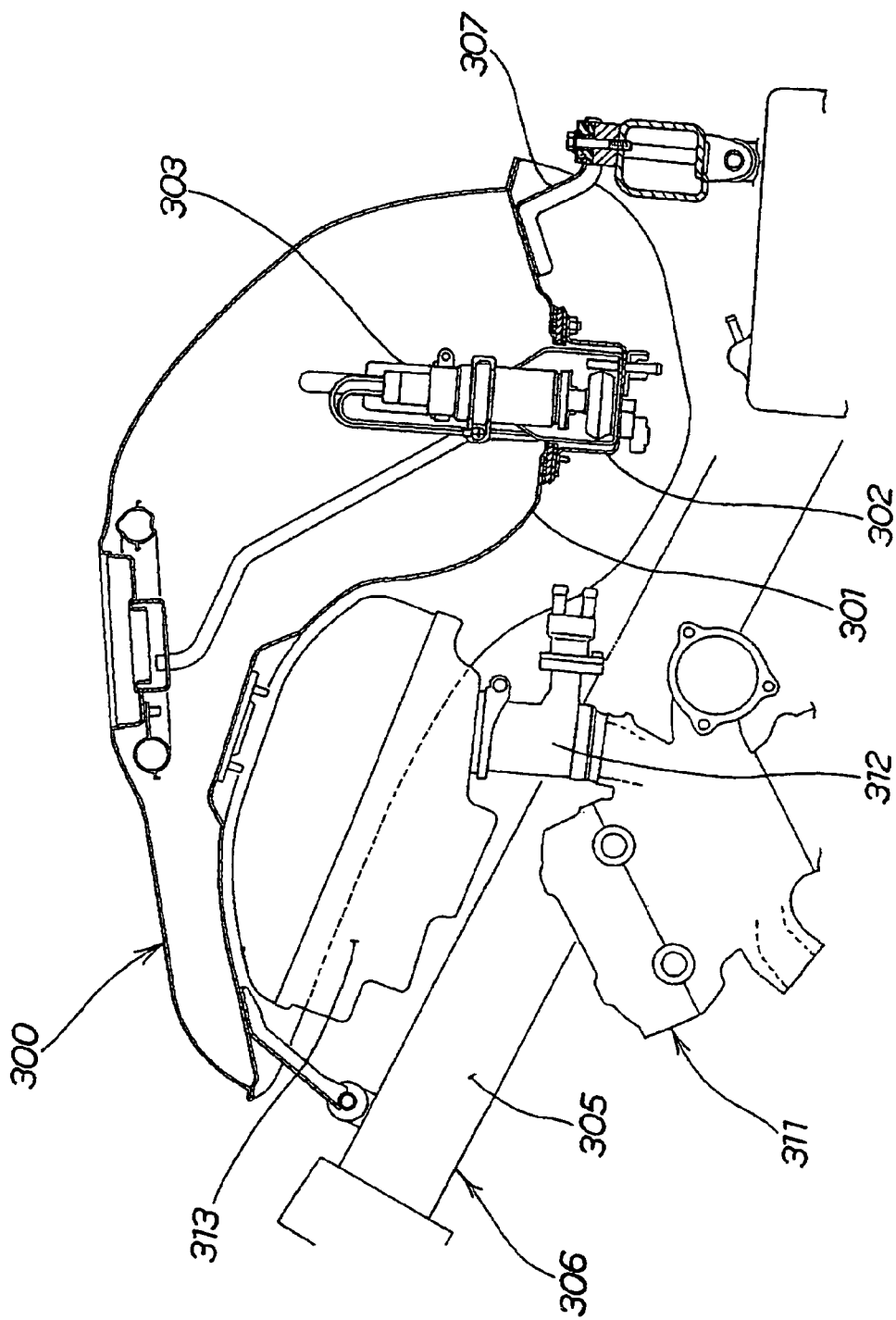
FIG. 15 is a cross-sectional view showing a conventional structure of fuel pump installation area for the two-wheeled vehicle.
Figure 16:
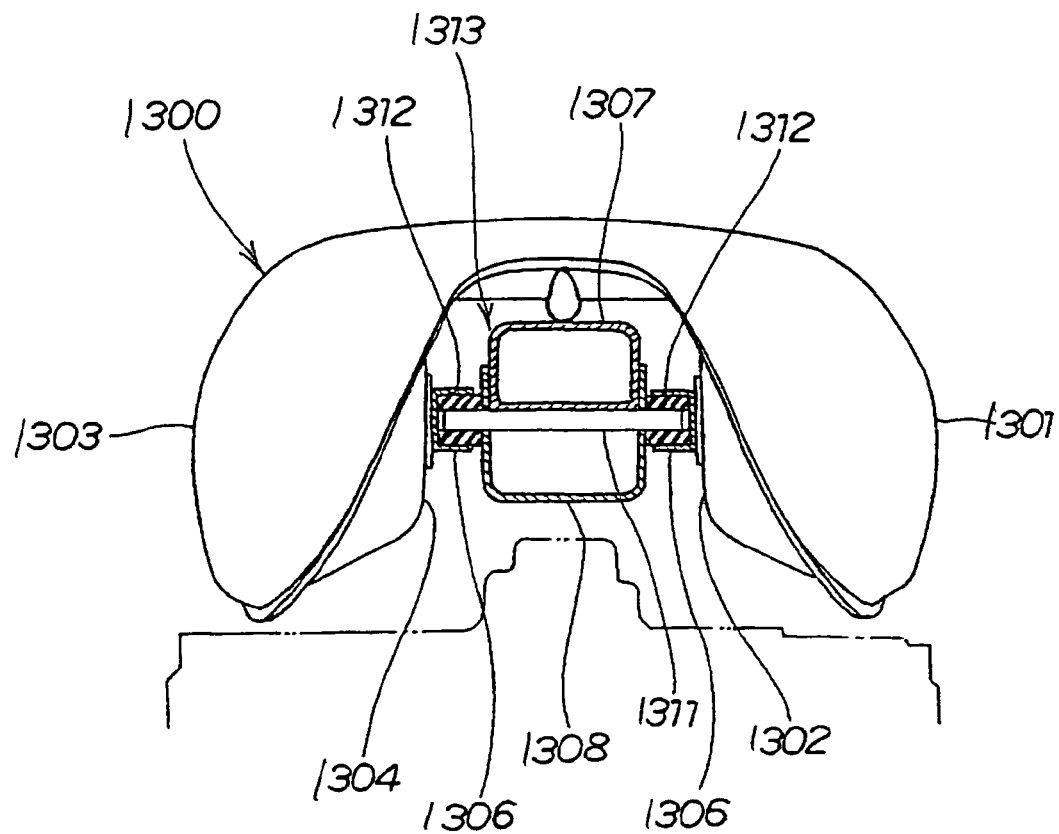
FIG. 16 is a front view of a principal part showing a conventional structure for installing a fuel tank for a two-wheeled vehicle.

In FIG. 14(a), the pipe bushing 236 is pressed into a through-hole 234a in the right extending member 234, and the washer 253 is touched to the side of the pipe bushing 236.

In FIG. 14(b), the first flanged collar 227 and the second flanged collar 228 are pressed into the inner surface of the cylindrical member 225 of the left hanger 221.

In FIG. 14(c), between the left hanger 221 and the right hanger 222, there are arranged the body-side left installation area 245 and the body-side right installation area 246 of the engine 18. The supporting bolt 248 is caused to pass through the bolt insertion hole 227a in the first flanged collar 227, the bolt insertion hole 228a in the second flanged collar 228, the bolt insertion hole 245a in the body-side left installation area 245, the bolt insertion hole 246a in the body-side right installation area 246 and the inner cylinder 238 of the pipe bushing 236.

In FIG. 14(d), the supporting nut 251 is screwed into the tip of the supporting bolt 248. Thereby, installation of the engine 18 to the rear upper engine hanger 44 is completed.

In the embodiment of the present invention, the tank installation stay has been installed to the pump installation member with bolts, but the present invention is not limited thereto. The tank installation stay may be installed to the pump installation member by welding and the pump installation member and the tank installation stay may be made into an integrally-molded article made of an aluminum alloy.

The body frame structure according to the present invention is suitable for a two-wheeled vehicle in which the fuel pump has been built in the fuel tank and the fuel pump has been arranged in the rear within the fuel tank.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure of a fuel pump installation area for a fuel tank is installed to a body frame and a fuel pump is provided within this fuel tank, comprising:
   a pump installation member for installing the fuel pump in said fuel tank; and
   a tank installation stay for fixing said fuel tank to the body frame, said tank installation stay being mounted on the pump installation member,
   wherein the tank installation stay is substantially U-shaped, and includes a pair of forward projecting portions that extend along right and left sides of the pump installation member.

2. The structure of a fuel pump installation area for a vehicle according to claim 1, wherein:
   an axis of a cylinder of an engine arranged below said fuel tank is caused to extend upwardly and an air intake system part extends toward the rear of the vehicle and is installed to the rear of said cylinder, and
   said pump installation member and said tank installation stay are arranged substantially above said air intake system part.

3. The structure of a fuel pump installation area for a vehicle according to claim 1, wherein said pump installation member is secured to said fuel tank and said plate member includes an aperture disposed therein for permitting said fuel pump to be positioned within said fuel tank.

4. The structure of a fuel pump installation area for a vehicle according to claim 1, wherein said tank installation stay is secured to said pump installation member and to the body frame for enhancing stiffness of the fuel pump disposed within the fuel tank.

5. The structure of a fuel pump installation area for a vehicle according to claim 1, wherein the tank installation stay includes a rear side projecting portion with a first bolt insertion hole disposed therein, and
   wherein the structure further comprises:
   a tank rear part supporting plate having a projecting portion with a second bolt insertion hole disposed therein, and
   a securing member being received within the first and second bolt insertion holes for mounting the tank rear part supporting plate and the fuel tank to the body frame.

6. The structure of a fuel pump installation area for a vehicle according to claim 5, wherein a cushion member is disposed between the projecting portion and the tank rear part supporting plate for absorbing shock.

7. The structure of a fuel pump installation area for a vehicle according to claim 1, wherein said tank installation stay includes a tank rear part supporting plate for operatively positioning the fuel pump relative to an interior of the fuel tank.

8. The structure of a fuel pump installation area for a vehicle according to claim 7, wherein said tank rear part supporting plate includes attaching portions for corresponding to attaching portions on a pump-side plate for ensuring the correct positioning of the fuel pump relative to the interior of the fuel tank.

9. The structure of a fuel pump installation area for a vehicle according to claim 7, and further including a seal mounted between the tank installation stay and the pump installation member for sealing fuel disposed within the fuel tank.

10. The structure of a fuel pump installation area for a vehicle according to claim 7, wherein the attaching portions on the tank rear part supporting plate and the attaching portions on the pump-side plate permit bolts to be mounted therethrough for mounting the fuel pump relative to the interior of the fuel tank.

11. The structure of a fuel pump installation area for a vehicle according to claim 1, the structure further comprising:
   a tank rear part supporting plate attached to said body frame and said tank installation stay for mounting the fuel tank to the body frame,
   wherein the tank rear part supporting plate is substantially crank-shaped.

12. The structure of a fuel pump installation area for a vehicle according to claim 1, further comprising:
   left and right inner walls of said fuel tank being formed by depressing the center of an underside of the fuel tank upwardly over the front and rear;
   concave-shaped engaging members are installed on the left and right inner walls for mounting said fuel tank relative to the body frame by engaging left and right convex portions provided on the body frame with the engaging members, respectively;
   a base member welded to said fuel tank forming one of said engaging members; and
   an engaging body for fastening to the base member by means of fastening means forming the other of said engaging members.

13. The structure of a fuel pump installation area for a vehicle according to claim 12, wherein a concave portion to be provided on each of said engaging members is constructed of a first concave portion provided on said base member and a second concave portion provided on said engaging body.

14. The structure of a fuel pump installation area for a vehicle according to claim 13, wherein a tank-side rear part installation area provided in the rear of said fuel tank is formed such that the tank installation stay is installed to said body frame.

15. The structure of a fuel pump installation area for a vehicle according to claim 12, wherein a tank-side rear part installation area provided in the rear of said fuel tank is formed such that the tank installation stay is installed to said body frame.

16. The structure of a fuel pup installation area for a vehicle according to claim 12, wherein the base member includes a U-shaped wall mounted thereon and projecting therefrom.

17. The structure of a fuel pump installation area for a vehicle according to claim 16, wherein the engaging body includes a U-shaped wall mounted thereon for mating with the U-shaped wall formed on the base member.

18. The structure of a fuel pump installation area for a vehicle according to claim 17, wherein apertures are formed in the engaging body and the base member for enabling the fastening means to secure the two relative to each other.

19. The structure of a fuel pump installation area for a vehicle according to claim 18, wherein the fastening means are bolts received within threaded apertures formed in the base member.

20. A structure of a fuel pump installation area for a fuel tank is installed to a body frame and a fuel pump is provided within this fuel tank, comprising:
   a pump installation member for installing the fuel pump in said fuel tank;
   a tank installation stay attached to left, right, and rear parts of the pump installation member; and
   a tank rear part supporting plate attached to said body frame and said tank installation stay for mounting the fuel tank to the body frame,
   wherein the tank rear part supporting plate is substantially crank-shaped.

* * * * *